(12) United States Patent
Bhatt et al.

(10) Patent No.: US 7,613,104 B2
(45) Date of Patent: Nov. 3, 2009

(54) METHOD, APPARATUS AND COMPUTER PROGRAM PRODUCT PROVIDING SYNCHRONIZATION FOR OFDMA DOWNLINK SIGNAL

(75) Inventors: Tejas Bhatt, Irving, TX (US); Vishwas Sundaramurthy, Irving, TX (US); Jianzhong Zhang, Irving, TX (US); Dennis McCain, Lewisville, TX (US)

(73) Assignee: Nokia Corporation, Espoo (FI)

( * ) Notice: Subject to any disclaimer, the term of this patent is extended or adjusted under 35 U.S.C. 154(b) by 571 days.

(21) Appl. No.: 11/444,735

(22) Filed: May 31, 2006

(65) Prior Publication Data

US 2007/0280098 A1    Dec. 6, 2007

(51) Int. Cl.
*H04J 11/00* (2006.01)
(52) U.S. Cl. .................. 370/208; 370/210; 370/509
(58) Field of Classification Search .......... 370/208, 370/210, 203, 324, 335, 343, 350, 503, 507, 370/509, 510, 511, 512, 513, 514
See application file for complete search history.

(56) References Cited

U.S. PATENT DOCUMENTS

| 6,493,395 | B1 * | 12/2002 | Isaksson et al. | 375/261 |
|---|---|---|---|---|
| 6,959,050 | B2 * | 10/2005 | Baum et al. | 375/326 |
| 7,502,311 | B2 * | 3/2009 | Song et al. | 370/208 |
| 2002/0101840 | A1 * | 8/2002 | Davidsson et al. | 370/330 |
| 2005/0128938 | A1 * | 6/2005 | Fang et al. | 370/210 |
| 2006/0227891 | A1 * | 10/2006 | Niu et al. | 375/267 |
| 2007/0019751 | A1 * | 1/2007 | Fanson et al. | 375/260 |
| 2007/0201349 | A1 * | 8/2007 | McCoy | 370/208 |
| 2007/0268846 | A1 * | 11/2007 | Proctor et al. | 370/279 |
| 2008/0014958 | A1 * | 1/2008 | Kim et al. | 455/452.2 |

(Continued)

FOREIGN PATENT DOCUMENTS

WO    WO-2004/049618 A1    6/2004

(Continued)

OTHER PUBLICATIONS

Bhatt et al., "Initial Synchronization for 802.16e Downlink", Signals, Systems and Computers, 2006. ACSSC '06. Oct. 29, 2006-Nov., the whole document.

(Continued)

*Primary Examiner*—Chi H. Pham
*Assistant Examiner*—Kevin Mew
(74) *Attorney, Agent, or Firm*—Harrington & Smith, PC

(57) ABSTRACT

Disclosed is a method, a computer program product and a device that includes a receiver for receiving a downlink signal transmitted into a cell. The receiver is operable to obtain time, carrier frequency and cell-specific preamble synchronization to the received signal and includes a plurality of synchronization units that include a first detector to detect a frame boundary using preamble delay correlation; a second detector to detect the frame boundary with greater precision using a conjugate symmetry property over a region identified by the first detector; a cyclic prefix correlator to resolve symbol boundary repetition; an estimator, using the cyclic prefix, to estimate and correct a fractional carrier frequency offset; an operator to perform a Fast Fourier Transform of an identified preamble symbol and a frequency domain cross-correlator to identify cell-specific preamble sequences and an integer frequency offset in sub-carrier spacing. The transmitted signal may be a downlink signal transmitted into the cell from a base station that is compatible with IEEE 802.16e (WiMAX).

37 Claims, 14 Drawing Sheets

U.S. PATENT DOCUMENTS

2009/0147868 A1* 6/2009 Ihm et al. .................. 375/260
2009/0168641 A1* 7/2009 Kao et al. .................. 370/208

FOREIGN PATENT DOCUMENTS

| WO | WO-2006/000091 A1 | 1/2006 |
| WO | WO-2006/015108 A2 | 2/2006 |
| WO | WO-2006/023536 A2 | 3/2006 |

OTHER PUBLICATIONS

Michael Speth et al., "Optimum Receiver Design for OFDM-Based Broadband Transmission-Part II: A Case Study", IEEE Transactions On Communications, vol. 49, No. 4, Apr. 2001, pp. 571-578.

WiMAX Forum, Mobile WiMAX System Profile, WiMAX XX xxx xxx v0.1.0, Feb. 2006, http://www.wimaxforum.org/apps/org/workgroup/211ghz.

$3^{rd}$ Generation Partnership Project; Technical Specification Group Radio Access Network; Feasibility Study of OFDM for UTRAN enhancement, (Release 6), 3GPP TR 25.892 v6.0.0 (Jun. 2004).

IEEE802.16-2004, IEEE Standard for Local and metropolitan area networks, Part 16: Air Interface for Fixed Broadband Wireless Access System, 2004 IEEE.

IEEE802.16e Supplement (version D8, Jun. 2005), IEEE Standard for Local Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, pp. 1-11 and pp. 317-650.

IEEE Std 802.11g-2003, IEEE Standard for Information technology-Telecommunications and information exchange between systems-Local and metropolitan area networks- Part 11: Wireless LAN Medium Access Control (MAC) and Physical Layer (PHY) specifications, Amendment 4: Further Higher Data Rate Extension in the 2.4 GHz Band, Jun. 27, 2003.

IEEE Std 802.11a-1999, Supplement to IEEE Standard for Information technology- Telecommunications and information exchange between systems- Local and metropolitan area networks- Part 11: Wireless LAN Medium Access Control (MAC) and Physical Layer (PHY) specifications: High-speed Physical Layer in the 5 GHZ Band, Dec. 30, 1999.

* cited by examiner

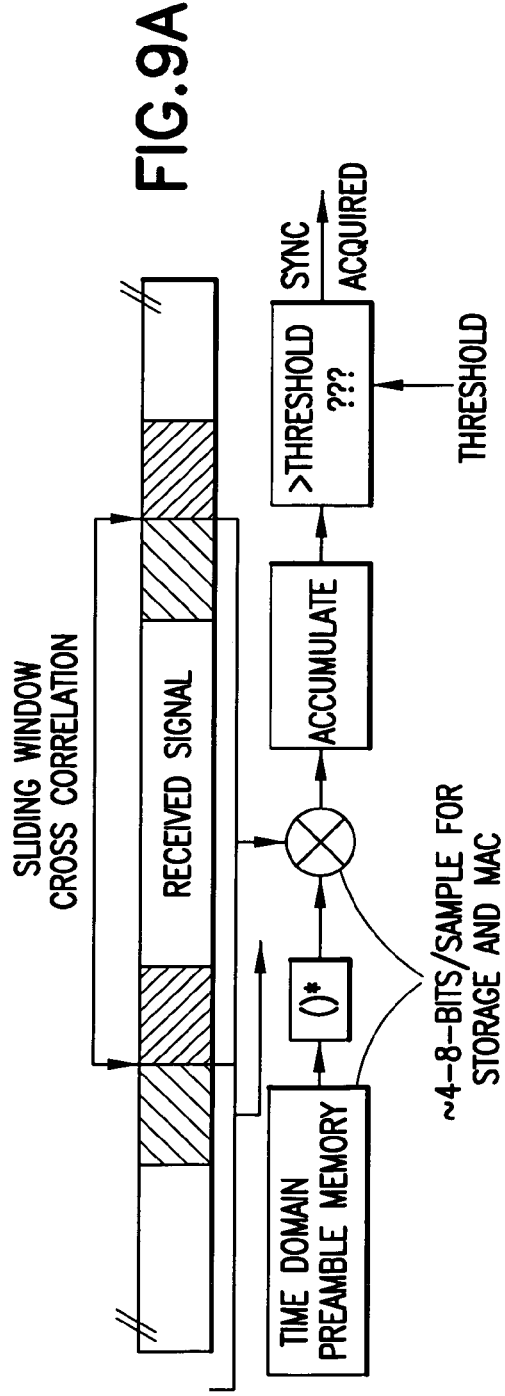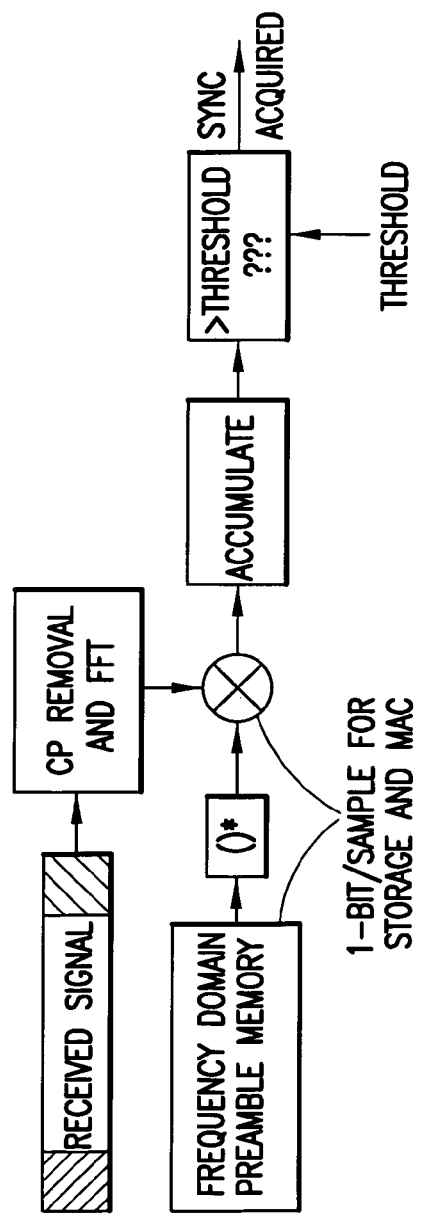

METHOD, APPARATUS AND COMPUTER PROGRAM PRODUCT PROVIDING SYNCHRONIZATION FOR OFDMA DOWNLINK SIGNAL

FIELD OF THE INVENTION

The exemplary embodiments of this invention relate generally to wireless communications systems, methods, devices and computer program products and, more specifically, relate to techniques to synchronize operation of a device using a received signal.

BACKGROUND OF THE INVENTION

The following abbreviations are defined as follows:
AWGN additive white Gaussian noise
BS base station
CINR carrier-to-interference-and-noise ratio
CP cyclic prefix
DFT Discrete Fourier Transfom
DL downlink
DLFP DL frame prefix
FDD frequency division duplex
FFT fast fourier transform
FUSC full usage of sub-carriers
MAC multiply-and-accumulate
MIMO multiple input multiple output
MISO multiple input single output
ML maximum likelihood
MS Mobile Station
OFDM orthogonal frequency division multiplex
OFDMA orthogonal frequency division multiplex with multiple access
PHY physical layer
RF Radio Frequency
RTG receive/transmit transition gap
SISO single input single output
SIMO single input multiple output
SNR signal-to-noise ratio
STC space-time coder
TDD time division duplex
TDMA time division multiple access
TTG transmit/receive transition gap
UL uplink
WiMAX Worldwide Interoperability of Microwave Access IEEE 802.16 promises to provide fixed and mobile wireless broadband services with peak data-rates of up to 70 mbps. Release E of the 802.16 standards defines necessary enhancements to support full mobility. The air interface of the mobile IEEE 802.16e is based on OFDM modulation technology. The OFDMA mode of 802.16e is expected to be most widely deployed for the mobile broadband services. The OFDMA mode provides bandwidth scalability from 1.25 MHz to 20 MHz (or 1.75 MHz up to 28 MHz) and, with the help of different FFT sizes (128, 512, 1024 and 2058), it can provide wireless services with different throughputs and QoS.

OFDM modulation has been used in various wireless access technology, such as Wi-Fi (802.11a) and digital audio and video broadcast (e.g. DVB-H). However, full mobility and QoS support for multiple users in a typical point-to-multipoint (cellular) environment have mandated many changes in the physical layer (PHY) and the medium access layer (MAC) design. One addition relates to the use of various downlink (DL) preamble sequences, which allow the MS to uniquely identify a BS. There are 114 preamble sequences for each FFT-size which can uniquely identify one BS (sector). In the TDD mode of 802.16e the preamble is transmitted in the first symbol in the DL sub-frame. As in the 802.11a system, the preamble is also useful in achieving the system time and carrier frequency synchronization. However, the structure of the preamble is different in 802.16e and 802.11a.

In typical TDD-based OFDM systems, such as 802.11a or the 802.16d OFDM mode, the preamble is repetitive in the time domain. This property can be utilized to achieve low complexity synchronization based on delay correlation techniques. In FDD mode, the continuous transmission of OFDM symbols along with cyclic prefix can be used to achieve the symbol time synchronization.

In 802.16e OFDMA mode, the preamble contains data at every third sub-carrier. Since 3 does not divide the FFT size (power of 2), the preamble in 802.16e OFDMA mode does not repeat in time; although every third part of preamble symbol does exhibit good correlation. Also, during TDD mode reception, the UL sub-frame follows the DL sub-frame. DL and UL sub-frame are separated by TTG and RTG gaps, which are not integer multiple of an OFDM symbol. This makes the conventional CP-based symbol time acquisition very challenging. Also, since the MS can receive transmissions from multiple BSs, the delay correlation based estimation of frame time (based on high correlation between parts of the preamble symbol) does not provide a good estimate of frame time. The delay correlation search typically returns a large window of possible frame start events.

Cross-correlation with the known preamble sequence, on the other hand, provides more accurate timing information. However, since there are a large number of possible preamble sequences, an exhaustive cross-correlation search would have prohibitively high hardware complexity. Time domain cross-correlation processing also requires that the preambles are either stored in the time domain (after IFFT), leading to higher memory requirements, or generated on the fly, leading to an additional IFFT for each preamble search.

Moreover, since the preamble sequences are randomly searched, they cannot be generated on the fly and must be stored. It is beneficial to store the preamble data in the frequency domain, as the preamble data modulation in the frequency domain is BPSK (1-bit). Several conventional OFDM synchronization techniques include the following.

A preamble-based packet synchronization scheme has been widely used in 802.11a systems. Two different types of preamble sequences are transmitted in 802.11a (short and long). The short preamble repeats about eight times (four times in one symbol and then transmitted twice), while the long preamble symbol repeats twice. The preambles are unique for all the access points in 802.11a. Typically the repetition property of the short preamble is exploited to obtain coarse time synchronization via delay correlation. The fine time synchronization can be achieved by searching for long preamble symbol. This can be obtained via delay correlation or cross correlation. The carrier frequency offset is measured by measuring the sample phase difference between repetitive parts of short preamble.

In terrestrial broadcast systems such as DVB-H, a CP-based delay correlation is implemented to obtain the symbol time. The carrier frequency offset can be measured in two steps: during a fractional frequency offset measurement using the phase of the CP correlation, and during an integer frequency offset measurement using the pilot rotation in the frequency domain.

However, in the TDD OFDMA mode, the above techniques either cannot be applied or return inaccurate time estimation.

Prior to this invention, no truly satisfactory procedure has been proposed to achieve DL synchronization in a device deployed in an IEEE 802.16e (WiMAX) communication system.

SUMMARY OF THE EXEMPLARY EMBODIMENTS OF THE INVENTION

The foregoing and other problems are overcome, and other advantages are realized, by the use of the exemplary embodiments of this invention.

In one aspect thereof the exemplary embodiments of this invention provide a method to obtain time, carrier frequency and cell-specific preamble synchronization to a transmitted signal by detecting a frame boundary using preamble delay correlation; detecting the frame boundary with greater precision using a conjugate symmetry property over a region identified during the first step of detecting the frame boundary; using cyclic prefix correlation to resolve symbol boundary repetition; using the cyclic prefix to estimate and correct a fractional carrier frequency offset; performing a Fast Fourier Transform of an identified preamble symbol and performing a frequency domain cross-correlation to identify cell-specific preamble sequences and an integer frequency offset in sub-carrier spacing.

In another aspect thereof the exemplary embodiments of this invention provide a computer program product that is embodied on a computer readable medium, where execution of the computer program product by a data processor results in operations that comprise obtaining time, carrier frequency and cell-specific preamble synchronization to a transmitted signal by detecting a frame boundary using preamble delay correlation; detecting the frame boundary with greater precision using a conjugate symmetry property over a region identified during the first operation of detecting the frame boundary; using cyclic prefix correlation to resolve symbol boundary repetition; using the cyclic prefix to estimate and correct a fractional carrier frequency offset; performing a Fast Fourier Transform of an identified preamble symbol and performing a frequency domain cross-correlation to identify cell-specific preamble sequences and an integer frequency offset in sub-carrier spacing.

In a still further aspect thereof the exemplary embodiments of this invention provide a device that includes a receiver for receiving a downlink signal transmitted into a cell. The receiver is operable to obtain time, carrier frequency and cell-specific preamble synchronization to the received signal and includes a plurality of synchronization units that include a first detector to detect a frame boundary using preamble delay correlation; a second detector to detect the frame boundary with greater precision using a conjugate symmetry property over a region identified by the first detector; a cyclic prefix correlator to resolve symbol boundary repetition; an estimator, using the cyclic prefix, to estimate and correct a fractional carrier frequency offset; an operator to perform a Fast Fourier Transform of an identified preamble symbol and a frequency domain cross-correlator to identify cell-specific preamble sequences and an integer frequency offset in sub-carrier spacing.

In a still further aspect thereof the exemplary embodiments of this invention provide a mobile station that comprises means for receiving a downlink signal transmitted into a cell, where the receiving means is operable to obtain time, carrier frequency and cell-specific preamble synchronization to the received signal and comprising a plurality of synchronization units comprising first means for detecting a frame boundary using preamble delay correlation; second means for detecting the frame boundary with greater precision using a conjugate symmetry property over a region identified by the first means for detecting; means for cyclic prefix correlation for resolving symbol boundary repetition; means for estimating and correcting, using the cyclic prefix, a fractional carrier frequency offset; means for performing a Fast Fourier Transform of an identified preamble symbol; and means for frequency domain cross-correlation for identifying cell-specific preamble sequences and an integer frequency offset in sub-carrier spacing.

BRIEF DESCRIPTION OF THE DRAWINGS

The foregoing and other aspects of the exemplary embodiments of this invention are made more apparent in the ensuing detailed description, when read in conjunction with the attached drawing figures, wherein:

FIG. 9A is a simplified block diagram of circuitry suitable for use with time domain frame time acquisition, while FIG. 9B is a simplified block diagram of circuitry suitable for use with frequency domain frame time acquisition;

DETAILED DESCRIPTION

Disclosed herein is a novel technique for initial time and carrier frequency synchronization. The exemplary embodiments of this invention are particularly well suited for the downlink of IEEE 802.16e, also known as WiMAX. However, while the exemplary embodiments are described in the context of WiMAX-related parameters, they may be applied as well to other OFDM systems with appropriate modifications to the parameters.

The exemplary embodiments of this invention provide a novel blind search algorithm for the 802.16e downlink, to achieve time and carrier frequency synchronization and identify the cell specific preamble sequence. The synchronization procedure is required during initial network entry, during handover and during re-synchronization after momentary loss of synchronization.

Before describing in detail the exemplary embodiments of this invention with reference to FIGS. 13-17, it will be useful to discuss and provide a brief overview of the system parameters and the DL PHY signaling of IEEE 802.16e. The focus of this overview is the OFDMA mode, which is currently the most relevant mode for mobility and cellular deployment.

With regard to basic OFDM system parameters, and as is well known, in an OFDM system the bandwidth is segmented into sub-carriers and the data is transmitted in parallel on different sub-carriers in the frequency domain. Spectrally efficient DFT and Inverse DFT (IDFT) transforms are employed for OFDM modulation and demodulation, respectively, and the transforms are implemented using efficient FFT and IFFT algorithms.

Assume that the available system bandwidth BW is segmented in $N_{FFT}$ sub-carriers. To allow the spectrum mask, a total of $N_{Guard}$ sub-carriers are reserved as the guard tones and are substantially equally distributed on the right and left side of the spectrum. Remaining sub-carriers are labeled as useful sub-carriers and include data, pilot and null (DC) sub-carrier(s). The number of useful sub-carriers are, $$N_{used} = N_{FFT} - N_{Guard} \quad (1)$$

Assuming an oversampling factor of n for the OFDM operation, the sampling frequency $F_S$ and sub-carrier spacing $\Delta f$ can be computed as, $$F_S = \left\lfloor \frac{n \times BW}{8000} \right\rfloor \times 8000 \quad (2)$$

and $$\Delta f = \frac{F_S}{N_{FFT}}$$

(see IEEE802.16e Supplement (version D8, June 2005), Draft IEEE Standard for Local and metropolitan area networks, Part 16: Air Interface for Fixed and Mobile Broadband Wireless Access Systems).

The inverse of sub-carrier spacing is the useful symbol time ($T_b$), which is the time of the useful OFDM symbol out of IFFT.

$$T_b = 1/\Delta f \quad (3)$$

Figure 1:
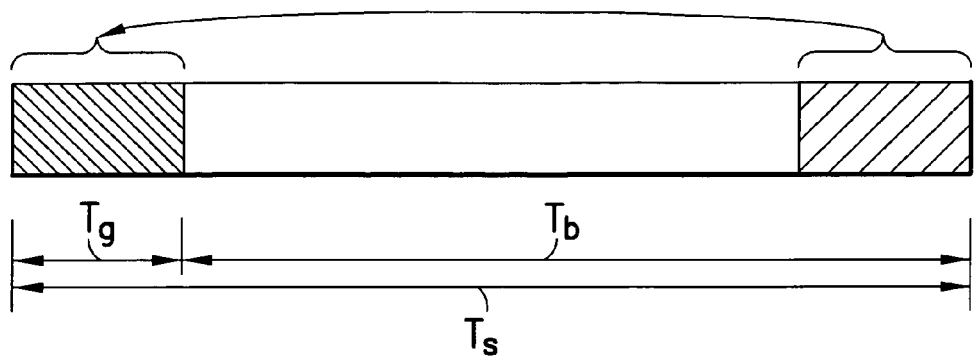
FIG. 1 shows a Guard Interval, Symbol Interval and a useful symbol interval.

To maintain the orthogonality of the OFDM signal in a multipath environment, a guard interval is inserted between two consecutive OFDM symbols. Commonly, a cyclic prefix is inserted as the guard interval by repeating the trailing portion of the symbol at the start of the symbol as depicted in FIG. 1. The duration of guard interval ($T_g$) is chosen to account for the highest multipath delay, $\tau_{max}$, that most frequently occur, i. e. $T_g > \tau_{max}$. It is commonly expressed as a fraction of useful symbol time. Let, $G = T_g/T_b$ be the ratio of guard interval to useful symbol interval, then the total OFDM symbol time is, $$T_s = T_b + T_g = (1+G)T_b \quad (4)$$

Further, the OFDM symbol time must be much greater than the maximum delay spread in order to reduce the overhead of cyclic prefix and combat the multipath interference. However, to avoid carrier leakage (i.e., inter-carrier interference), the OFDM symbol time must be smaller than the channel coherence time ($T_c$). Channel coherence time is defined as the time interval within which the channel remains flat, and is inversely proportional to the maximum Doppler spread ($f_D$). The Doppler spread is a result of the relative velocity between transmitter and receiver and which causes the inter-carrier interference between adjacent sub-carriers.

$$T_s \gg \tau_{max} \quad (5)$$

and $$T_s \ll T_c \Leftrightarrow T_s \ll \frac{1}{f_D}$$

$$T_c = \sqrt{\frac{9}{16\pi f_D^2}} \quad (6)$$

The channel coherence bandwidth $B_c$ is defined as the bandwidth over which the channel response remains flat and it is inversely proportional to the maximum channel delay spread $\tau_{max}$. The channel coherence bandwidth can be calculated as:

$$B_c = \frac{1}{5\tau_{max}}.$$

The frequency-domain equivalent of eqn. (5) is, $$\Delta f \ll B_c \Leftrightarrow \Delta f \ll 1/\tau_{max} \text{ and } \Delta f \gg f_D \quad (7)$$

Thus, the FFT size is chosen such that inter-carrier spacing is sufficiently smaller than the channel coherence bandwidth and sufficiently higher than the maximum Doppler spread ($f_D$) in the channel.

Figure 2:
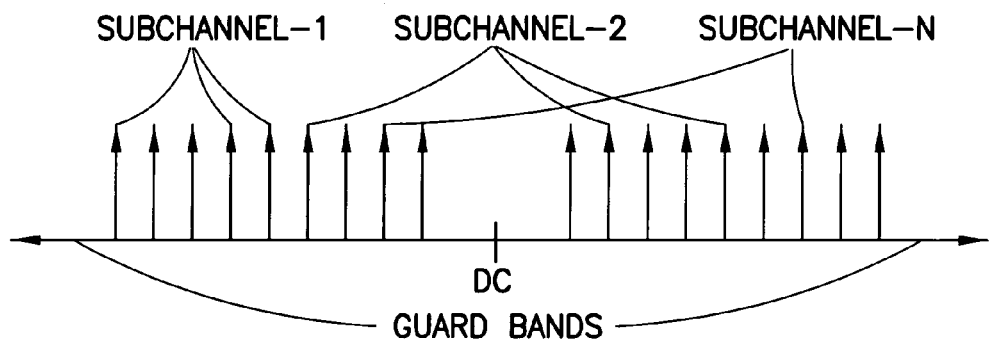
FIG. 2 illustrates the OFDMA concept where sub-carriers are shared between users.

Discussed now is a PHY overview of 802.16e DL. TDMA is the most common approach to achieve multi-user access in an OFDM system. In this approach, referred to as OFDM-TDMA, various users are time-multiplexed and data, to and from each user, is transmitted in different time zones. This mode is specified as an air interface for various standards such as IEEE 802.11a/g/n and 802.16d (Rev-2004) (OFDM Mode). Another way to achieve multi-user access in OFDM system is to multiplex different user in frequency domain and is referred to as OFDMA. FIG. 2 represents the multiple access strategy of OFDMA, where different users share the useful sub-carriers.

Figure 3:
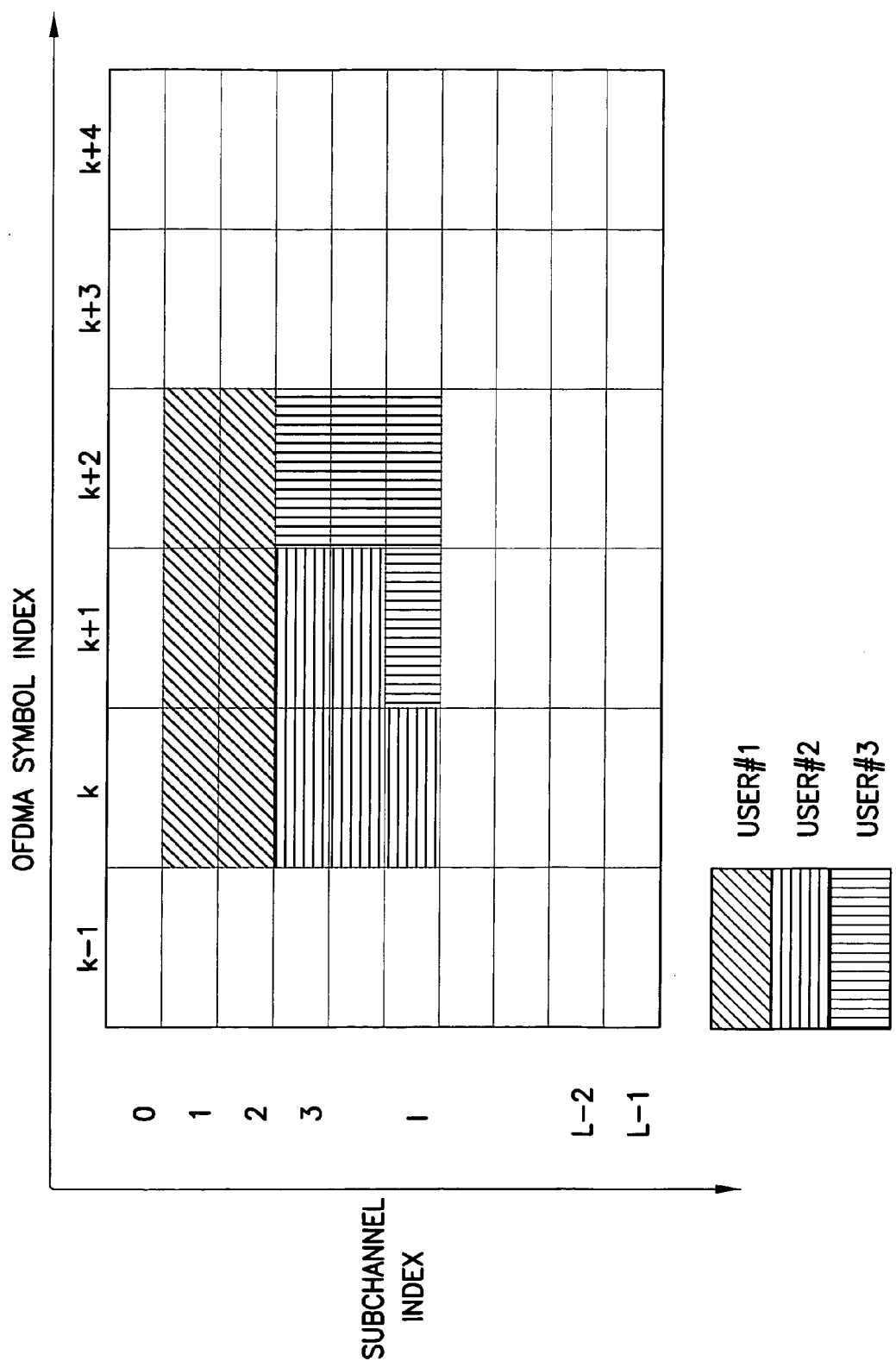
FIG. 3 depicts the concept of data mapping in time/frequency.

More commonly, in the OFDMA mode the users are multiplexed in a two dimensional time/frequency grid, where each user is allocated a part of the bandwidth (i.e. a group of sub-carriers, referred to as sub-channels) over few OFDM symbol(s). FIG. 3 describes the concept of data region across time/frequency axis, for an imaginary usage scenario.

Table 1 summarizes key system parameters and their values as defined for the 802.16e OFDMA mode. It should be noted that WiMAX systems are scalable to the given bandwidth and deployment scenario.

TABLE 1

OFDMA System Parameters

| Parameters | Values | Remarks |
| --- | --- | --- |
| $N_{FFT}$ | 128, 512, 1024 and 2048 | FFT-Size |
| $G = T_g/T_b$ | 1/32, 1/16, 1/8, 1/4 | Ratio of Guard Interval to Useful Symbol Interval |
| $T_S$ | $T_b + T_g = (1 + G) \times T_b$ | OFDMA Symbol Interval |
| BW | Minimum~ 1.25 MHz Maximum~ 28 MHz | Typical values. Not standards related** |
| n | 8/7 | Oversampling Factor |

**Typically FFT Size would increase with the BW

WiMAX supports three different types of communications modes in the licensed band, TDD, FDD and H-FDD (Hybrid-FDD). In the first release of IEEE 802.16e, the TDD mode would be most widely deployed.

Figure 4:
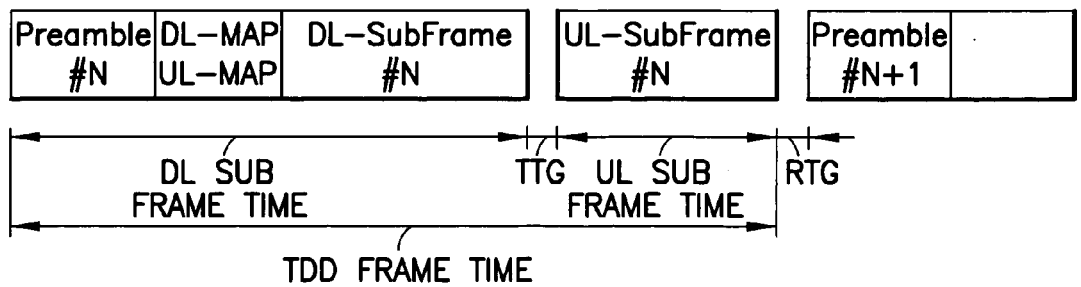
FIG. 4 shows a TDD frame structure (DL-Subframe+TTG+UL-Subframe+RTG)

FIG. 4 describes the frame timing for the TDD mode. The Transmit Time Gap (TTG) and Receive Time Gap (RTG) allows the BS and MS to switch and ramp-up the RF from RX to TX or from TX to RX mode. Table 2 summarizes the frame time and TTG/RTG specifications for WiMAX systems.

TABLE 2

OFDMA Frame Timing Parameters

| Parameters | Values | Remarks |
| --- | --- | --- |
| Frame-Time (ms) | 2, 2.5, 4, 5, 8, 10, 12.5, 20 | Standard Specified Frame time code: 1-8 |
| DL/UL Ratio (TDD) | 1/4\|3/4-To 3/4\|1/4 | Typical Value. Not standardized. |
| TTG/RTG | Minimum Supported: 5 us Typical Value~ 50 us Maximum > 200 us | Standard only specifies 5 us as minimum value. Typical value based on literature survey. |

Another important system parameter that impacts the PHY implementation is the allowable carrier frequency offset tolerance (system clock tolerance). Table 3 tabulates the specifications of 802.16e.

TABLE 3

Transceiver Carrier Frequency Tracking Requirements

| Parameters | Values | Remarks |
| --- | --- | --- |
| BS Center Frequency and symbol Clock Reference Accuracy | ±2 × 10⁻⁶ | Same reference oscillator shall be used for both carrier and symbol clock frequency |
| MS TX Center Frequency and Symbol Clock Frequency Tolerance | 2% of Sub-carrier Spacing | Synchronized to BS Reference - Must be acquired before UL-TX |

Figure 5:
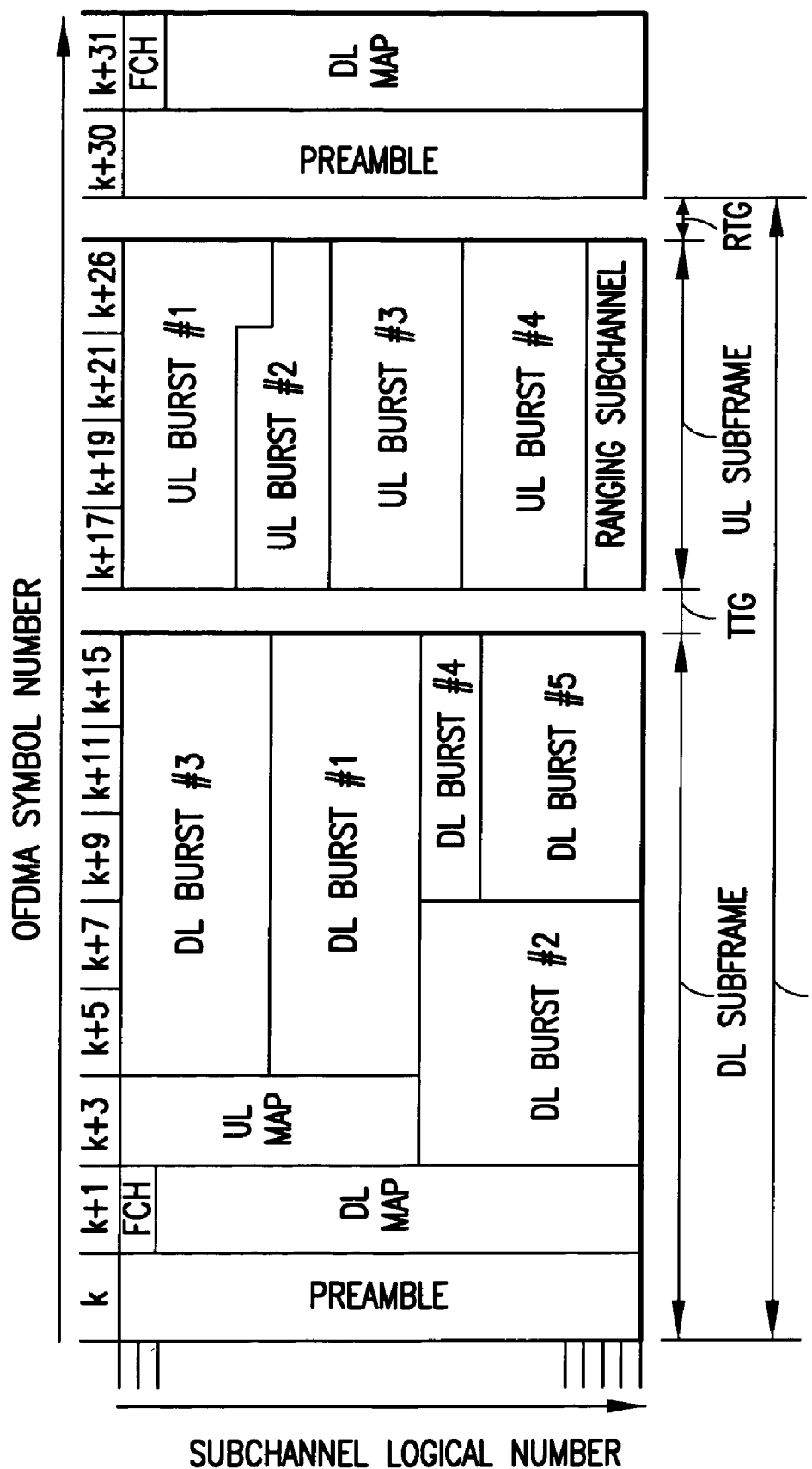
FIG. 5 shows a typical frame structure for the TDD Mode.

FIG. 5 shows frame structure for the TDD mode. The first symbol of DL subframe is the DL preamble. First two subchannels in the following OFDMA symbol carry FCH. DL-MAP and UL-MAP follow the FCH. The MAP messages share symbol and frequency space with FCH and DL-Bursts. In the TDD mode, the DL and UL Subframe follows the MAP-messages. The data bursts of various users are allocated in time/frequency dimensions.

A DL frame (or sub-frame for TDD mode) may contain several zones, such as PUSC, FUSC, TUSC1, AMC, MIMO, HARQ etc. A zone spans over a few consecutive OFDMA symbols. The timing of DL sub-frame can be decided dynamically based on available subchannels, sub-carrier allocation modes, number of users to be served and in case of TDD mode, the DL-to-UL time ratio.

Figure 6:
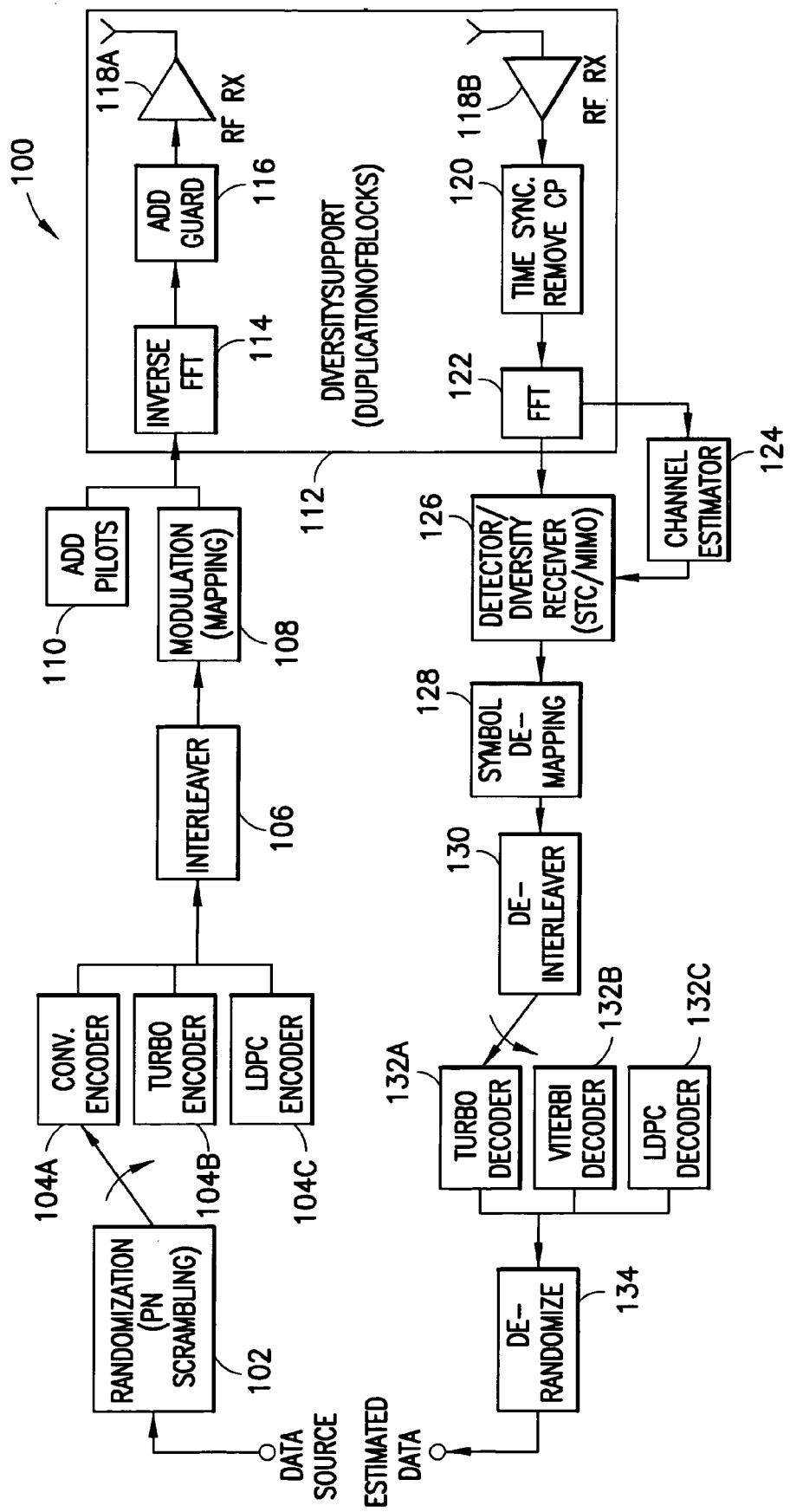
FIG. 6 presents a block diagram of a mobile transceiver for use with the OFDMA PHY.

Focusing on the TDD mode of the IEEE 802.16e standards, FIG. 6 depicts an exemplary downlink (mobile) transceiver 100. It should be noted that even though the IEEE 802.16e standard supports multiple transmit and receive antennas, only a SISO system is considered herein for ease of description.

In FIG. 6 a data source provides data to be transmitted to a randomization (PN scrambling) block 102 having an output selectively applied to one of a plurality of encoders (e.g., Convolutional encoder 104A, Turbo encoder 104B, LDPC encoder 104C). The output of the selected encoder 104 is provided to an interleaver 106, followed by a modulation (mapping) block 108. Pilot signals are added to the output of the modulation block 108 from block 110. The signal is then applied to a diversity support block 112 having an IFFT block 114 and a block 116 that adds a guard band(s). The signal is then applied to an RF transmitter (TX) 118A for transmission to a channel. For reception, the received signal is output from a RF receiver (RX) 118B to a time synchronization block 120 where the CP is removed, followed by a FFT block 122. The output of the FFT block 122 is applied both to a channel estimator 124 and to a detector/diversity receiver block 126 (STC/MIMO). The output of block 126 is applied to a symbol demapping block 128, followed by a de-interleaver block 130, the output of which is applied to a selected decoder (e.g., Turbo decoder 132A, Viterbi decoder 132B, LDPC decoder 132C). The output of the selected decoder 132 is applied to a de-randomizer block 134, and the resulting signal forms estimated data.

Let, $s^m(n)$ denote the downlink signal at the output of the OFDM modulator.

$$s^m(n) = \frac{1}{N_{FFT}} \sum_{k=0}^{N_{FFT}-1} d_k^m e^{\frac{j2\pi kn}{N_{FFT}}}, n \in [-N_{CP}, N_{FFT} - 1]$$

Hence the corresponding continuous time downlink signal $s^m(t)$ can be written as, $$s^m(t) = \frac{1}{N_{FFT}} \sum_{k=0}^{N_{FFT}-1} d_k^m e^{\frac{j2\pi k(t-T_s(m))}{T_b}}$$

where, $N_{FFT}$, $N_{CP}$: FFT size and Guard (Cyclic Prefix (CP)) Size;
$T_b$, $T_g$, $T_s \equiv T_b + T_g$: Useful symbol Time, CP Interval and OFDM Symbol time;
k,m: Sub-carrier index and OFDM symbol index; and $d_k^m$: Transmitted symbol on $k^{th}$ sub-carrier during $m^{th}$ OFDM symbol.

The discrete downlink received signal at the mobile station receiver can be written as, $$r_{DL}(n) = \sum_{m=-\infty}^{\infty} \sum_{i=-N_{CP}}^{N_{FFT}-1} \sum_{l=0}^{L-1} s^m(i) h_l(n - m(N_{FFT} + N_{CP}) - i) e^{j2\pi\Delta f n} + z(n)$$

where,
$h = [h_0, h_1, \ldots, h_{L-1}]$, L: Multipath Channel between BS and MS and maximum multipaths;
$\Delta f$: Normalized carrier frequency offset due to oscillator mismatch between TX and RX; and
$z(n) \sim N(0, 2N_0)$ is an additive white Gaussian noise process.

During an uplink time-frame the mobile station typically switches to the transmit mode. However, during initial network access the mobile station does not differentiate between DL and UL and, hence, receives interference signal(s) from other mobile stations. The overall received signal in UL can be written as, $$r_{UL}(n) = \sum_{k=1}^{K} \sum_{m=-\infty}^{\infty} \sum_{i=-N_{CP}}^{N_{FFT}-1} \sum_{l=0}^{L-1} u^{k,m}(i - \tau_k) h_l^k(n - m(N + N_{CP}) - i) e^{j2\pi\Delta f_k n} + z(n)$$

where,
$h^k = [h_0^k, h_1^k, \ldots, h_{L-1}^k]$: Multipath Channel between $k^{th}$ MS and desired MS;
$\Delta f_k$: Normalized carrier frequency offset; and
$\tau_k$: Normalized delay of received signal from $k^{th}$ user.

Discussing now the properties of the preamble, a cell-specific DL preamble is transmitted at the start of every frame. The preamble aids the receiver in acquiring time, frequency and channel parameters. A brief summary is now made of the structure and properties of the DL preamble, which will be referenced below when discussing the exemplary embodiments of this invention.

The preamble sequence has the following properties (reference can be made to IEEE802.16-2004, IEEE Standard for Local and metropolitan area networks, Part 16: Air Interface for Fixed Broadband Wireless Access System, and to IEEE802.16e Supplement (version D8, June 2005), Draft IEEE Standard for Local and metropolitan area networks, Part 16: Air Interface for Fixed and Mobile Broadband Wireless Access Systems, incorporated by reference herein in their entireties):
it is unique for each segment in each cell (i.e., specifies the cell-ID);
it contains a set of 114 preamble sequences for each FFT-size (128, 512, 1024 and 2048);
it is generated using random simulation with the constraint of minimizing the PAPR of the sequence;
the preamble is modulated to a sub-carrier with BPSK modulation and hence the IFFT output has conjugate-symmetry (see, for example, J. G. Proakis and D. K. Manolakis, "Digital Signal Processing", $3^{rd}$ Edition, Prentice Hall, 1995);
a sector transmits a preamble sequence on every third sub-carrier, with regularly inserted zeros (except for guard and DC sub-carriers); and
the DL preamble sub-carriers are transmitted at 9 dB higher power than other data sub-carriers.

The preamble sequences are generated with random simulation and are stored in the MS. Since each FFT-size corresponds to a set of 114 preambles, considerable memory is required at the MS to store the preambles. In that preamble detection is the first step for the network entry, the large number of preamble sequences may result in long delay.

The preamble signal at the output of the OFDM modulator can be written as, $$s^P(n) = \sum_{k=0}^{N_{FFT}-1} c_k e^{\frac{j2\pi k n}{N_{FFT}}}$$

where, $$c_k = \begin{cases} 4\sqrt{2}\left(\frac{1}{2} - u_k\right), & k = SID:3:\frac{N_{FFT}}{2} - N_{RG}, +N_{LG} + SID:3:N-1 \\ 0, & \text{otherwise} \end{cases}$$

and, $u_k \in \{0, 1\}$ = PN Preamble Sequence for Segment # SID $N_{LG}$ = Left Guard Subcarries $N_{RG}$ = Left Guard Subcarries Property-1:

Let, $x(n) = \text{ifft}\{X(k)\}$ and $$X(k) = \begin{cases} X(m), & m = Rk, k = 0, 1, 2, \cdots \frac{N_{FFT}}{R} - 1 \\ 0, & \text{otherwise} \end{cases}, \text{ such that}$$

$\text{mod}(N_{FFT}, R) = 0$ then, $$x\left(p\frac{N_{FFT}}{R} + i\right) = x(i), p = 0, 1, \cdots R-1:$$

i.e. Periodic in Time Domain

However, if $\text{mod}(N_{FFT}, R) \neq 0$, the signal is not repetitive, but shows strong correlation.

Property-2:
Let, $x(n) = \text{ifft}\{X(k)\}$ and $X(k)$ be real, then, $$x(n) = \begin{cases} x(n), & n = 0, 1, 2, \cdots \frac{N_{FFT}}{2} \\ x^*(N-n), & n = \frac{N_{FFT}}{2} + 1, \cdots, N_{FFT} \end{cases},$$

i.e. conjugate symmetric in Time Domain

Since properties 1 and 2 co-exist, the time-domain preamble sequence assumes conjugate symmetry within each repetition. The preamble symbol carries data on every $3^{rd}$ sub-carrier and hence shows high correlation between each ⅓ of the symbol. Due to conjugate symmetry, the preamble roughly assumes following structure, $$s^P \approx [a\ a^*a\ a\ a^*a\ a^*]$$

A discussion is now made of initial synchronization in generic OFDM systems. As was noted above, the synchronization procedure includes time synchronization and carrier frequency synchronization. The main goal of time synchronization is to acquire frame and symbol timings, identify FFT size and the CP length. The main objective of carrier frequency synchronization is to measure and correct the carrier frequency offset. Moreover, in cellular systems such as WiMAX, the synchronization also determines the cell ID (cell specific preamble sequence).

As was also noted above, various methods and algorithms have been proposed and evaluated for time/frequency acquisition in various OFDM systems, such as 802.11a and DVB-H. Most of the proposed algorithms typically exploit cyclic prefix and/or preamble properties. For example, in 802.11a, a repetitive short preamble is used for time and frequency synchronization (see J. Heiskala and J. Terry, "OFDM Wireless LANs: A Theoretical and Practical Guide", $1^{st}$ edition, Sams, 2001). The long preamble is then used to refine the timing estimate as well as for channel estimation purposes. In broadcast systems such as DVB-H, where the received signal is continuous, the cyclic prefix and pilot symbols can be utilized to achieve the synchronization. Computationally efficient delay correlation techniques may be employed in these synchronization schemes.

In both IEEE 802.11a and DVB-H, a staged synchronization procedure is usually employed for time and frequency synchronization, where time and frequency offsets are estimated in different stages. Moreover, the fine time/frequency estimation follows the coarse time/frequency estimation. Typically, the staged approach yields a low complexity implementation and is more suitable for mobile receivers.

Alternatively, time and frequency parameters can be estimated jointly. For example, ML and sub-optimal ML methods may be used for joint time/frequency synchronization and channel estimation. However, both of these methods require prior knowledge of the transmitted preamble symbol, but do not require special preamble properties. Hence, they are more suitable for systems such as 802.16 OFDM mode and 802.11a. Such methods can be exploited in a cellular WiMAX implementation, if the set of transmitted preamble sequences is limited (e.g. during Handover, BS may signal information about neighboring BS). However, the implementation complexity of the ML method is high.

A conventional synchronization OFDM method is now briefly discussed, as is its suitability for use in an IEEE 802.16e system.

The basic synchronization procedure involves the following various operations.

One operation is time synchronization which is composed of symbol time acquisition, based on CP correlation and which is appropriate for use in a FDD mode where DL transmission is continuous (e.g. DVB-H), and on frame time acquisition/packet start detection based on cross correlation with a known preamble or delay-correlation using repetitive properties of a preamble sequence, and which is appropriate for packet data transmission (e.g. 802.11a). Another operation is frequency offset estimation which is composed of time domain fractional frequency offset estimation, frequency domain coarse frequency offset estimation (a coarse estimation to find a frequency offset that is an integer multiple of the sub-carrier spacing). A short repetitive preamble can be used to avoid a frequency domain frequency offset correction (e.g. 802.11a).

Figure 7:
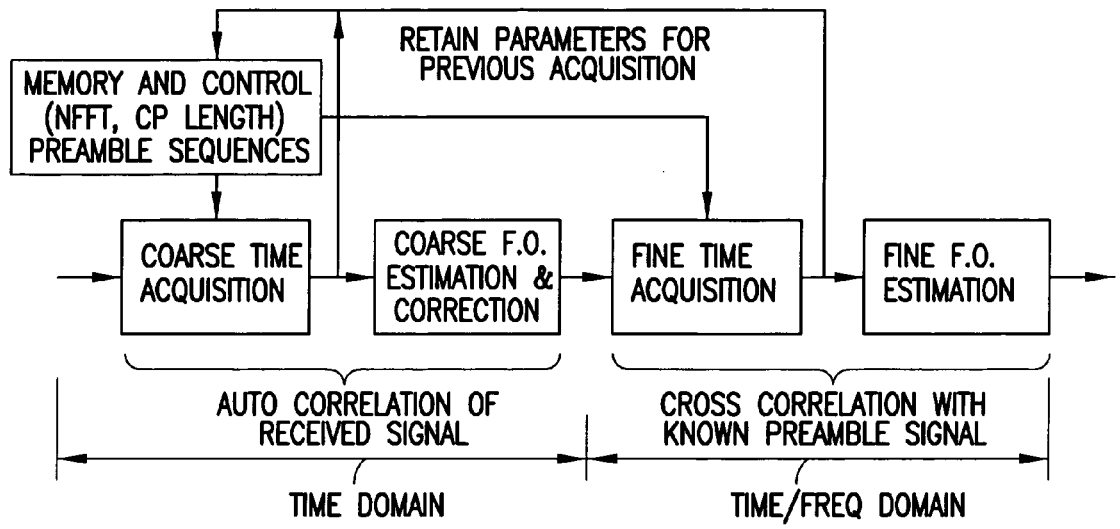
FIG. 7 illustrates a typical conventional synchronization procedural flow.

In general, the synchronization parameter estimation is performed in stages—coarse time acquisition (delay-correlation of received signal), followed by coarse frequency offset estimation and correction and then fine-time synchronization (cross-correlation with known preamble or delay-correlation), followed by frequency domain frequency offset estimation. If the transmitted preamble sequences are sufficiently short and repeat often the overall frequency offset can be measured in just one stage. In all procedures a sliding window correlator and an accumulator are used to obtain the correlation. FIG. 7 depicts a logical flow for the synchronization procedure. The main operations of the time/frequency estimation procedure may overlap.

Typically any synchronization algorithm requires a substantial number of multiply-and-accumulate (MAC) operations. Thus, even though the actual algorithm may be simple, the hardware cost of synchronization can be high. L. Schwoerer and H. Wirz, "VLSI Implementation of IEEE 802.11a Physical Layer", 6th International OFDM-Workshop, Hamburg/Germany, September 2001 have estimated that for a typical 802.11a ASIC implementation, the synchronization blocks occupy about 50% of the overall receiver hardware.

The various synchronization steps briefly mentioned above are now described in further detail.

Symbol Time Acquisition

Symbol time acquisition can be implemented using a cyclic prefix search with a sliding window auto-correlation of the received signal. The auto-correlation values are accumulated over a few symbols and compared with the threshold. A RAM (or FIFO) can be used to store and delay the stream of received data samples. The complexity of this block is determined by the maximum FFT size that is supported. The auto-correlation values can be computed as, $$A_c(n) = \sum_{i=0}^{N_{CP}-1} r_{n-i} r^*_{n-i-N_{FFT}}$$

Thus at every sample, $N_{CP}$ complex MACs must be computed. The foregoing implementation can be simplified to the use of only two complex MACs per sample as follows, $$A_c(n) = A_c(n-1) + r_n r^*_{n-N_{FFT}} - r_{n-N_{CP}} r^*_{n-N_{CP}-N_{FFT}}$$

A single MAC operation is also possible, but would require a FIFO delay element that can contain $N_{CP}$ complex values. In order to perform accumulation over multiple symbols, a buffer of size $N_{FFT}$ is required to hold the cross correlation values. Typically, the correlation values are scaled by received power before threshold detection in order to obtain a robust detection. The received power can be computed using one or two MACs per sample over the cyclic prefix interval as explained above.

$$\frac{\|A_c(n)\|^2}{P(n)} > \text{Threshold or } \|A_c(n)\|^2 > \text{Threshold} \times P(n), \text{ where,}$$

$$P(n) = \sum_{i=0}^{N_{CP}-1} r_{n-i} r^*_{n-i}$$

Figure 8:
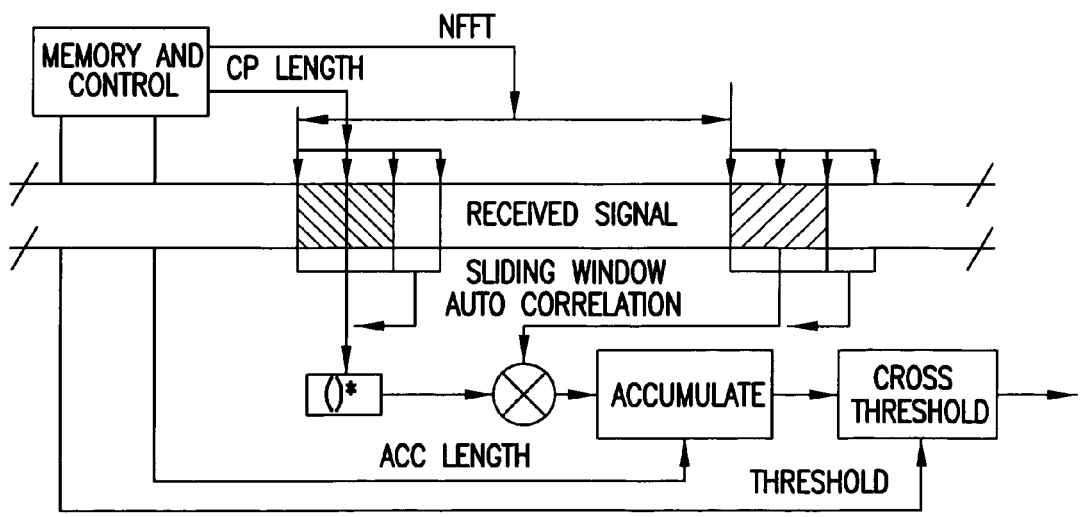
FIG. 8 is a simplified block diagram of circuitry for performing cyclic-prefix based symbol time estimation.

FIG. 8 depicts the symbol time synchronization block diagram. The synchronization can be implemented with an arbitrary precision with oversampling; however, this increases the complexity.

As is shown in FIG. 8, the parameters such as FFT size and CP length are typically retained in the memory for the current valid synchronization. This mechanism may aid in reducing the synchronization time during a re-synchronization procedure or during future initial entry.

Frame Time Synchronization

Frame synchronization can be implemented as coarse or fine time estimation employing a preamble search. A delay-correlation of a received signal or a cross-correlation with a known preamble pattern is obtained and compared with the threshold to determine the frame timing.

In case of repetitive preamble transmission (zero-insertion in frequency domain), the delay-correlation method may be employed to coarsely acquire the start of preamble. This can be readily used in Wi-LAN and IEEE 802.16 Rev-2004 OFDM mode (FFT-256).

$$\hat{\tau}_{FTS} = \max_{n} \left| \sum_{i=0}^{P-1} r_{n-i} r^*_{n-i-P} \right|, \quad P = \frac{N_{FFT}}{R} = \text{Periodicity.}$$

However, this does not resolve the identity of a particular preamble sequence, e.g. in IEEE 802.16e, 114 different preamble sequences are defined for each FFT size and each BS transmits a unique preamble sequence.

Cross correlation between a known preamble pattern and a received symbol is obtained and compared with the threshold in order to determine the validity of the search. A "max" operation can be performed to find the maximum of the cross-correlation in order to find the preamble. Assuming that the parameters preamble start, FFT size and CP size are known, and that there are a total of K preambles, the frame time synchronization implements, $$\hat{\tau}_{FTS} = \max_{k} \left| \sum P^*_k(n) r(n) \right|, \quad k = 1, 2, \ldots, K - \text{Acquires Cell-}ID$$

An exhaustive search can be implemented in case the FFT size is not known. Assuming a total of K preambles, the frame time synchronization implements, $$X^k_c(n) = \left| \sum_{m=0}^{N_{FFT}-1} P^*_m r_{n-m} \right|, \quad k = 1, 2, \ldots K$$

$<\hat{n}, \hat{k}> = \{ <n, k> | X^k_c(n) \geq \text{Threshold} \}$—Acquires time, FFT size and Cell-ID Moreover, for coarse time estimation, a high frequency offset must be taken into account while computing the correlation. Since frequency offset changes the phase of the received signal, the coherent accumulation is segmented into a smaller window. Assuming $$S = \frac{N_{FFT}}{M}$$

correlation windows of size M, $$X^k_c(n) = \sum_{s=0}^{S-1} \left| \sum_{m=sM+0}^{(s+1)M-1} P^*_m r_{n-m} \right|, \quad k = 1, 2, \ldots K$$

To reduce the complexity, accumulation over smaller segments of preamble can be considered.

FIGS. 9A and 9B describe simplified block diagrams for above two approaches. Further analysis is required to evaluate various trade-offs. However, the time-domain approach of FIG. 9A is more suitable for use with a preamble stored in frequency domain.

Fractional Frequency Offset Correction

The frequency offset can be estimated using the average phase progression of a replicated set of time-domain OFDM samples. The phase estimation employs the calculation of the arc tangent (inverse tangent). Fractional frequency offset estimation can either be accomplished using a comparison with a repeated preamble, or by using the repeated cyclic prefix of the same OFDM symbol. The first method is viable in IEEE 802.11a, where a short preamble is repeated several times. Further, in the case of the 802.11a short preamble, both fractional and integer frequency offset can be measured with just one stage of delay correlation. For WiMAX OFDMA, the second method is preferable since the preamble is only one OFDM symbol in length. To reduce estimation error, the CP correlation is averaged for M OFDMA symbols. Let, $\hat{\tau}$ be the estimated coarse time offset, then coarse frequency offset can be estimated as, $$\hat{\phi}_\Delta = \tan^{-1} \left( \sum_{m=1}^{M} A_c(\hat{\tau} + m(N_{FFT} + N_{CP})) \right)$$

Figure 10:
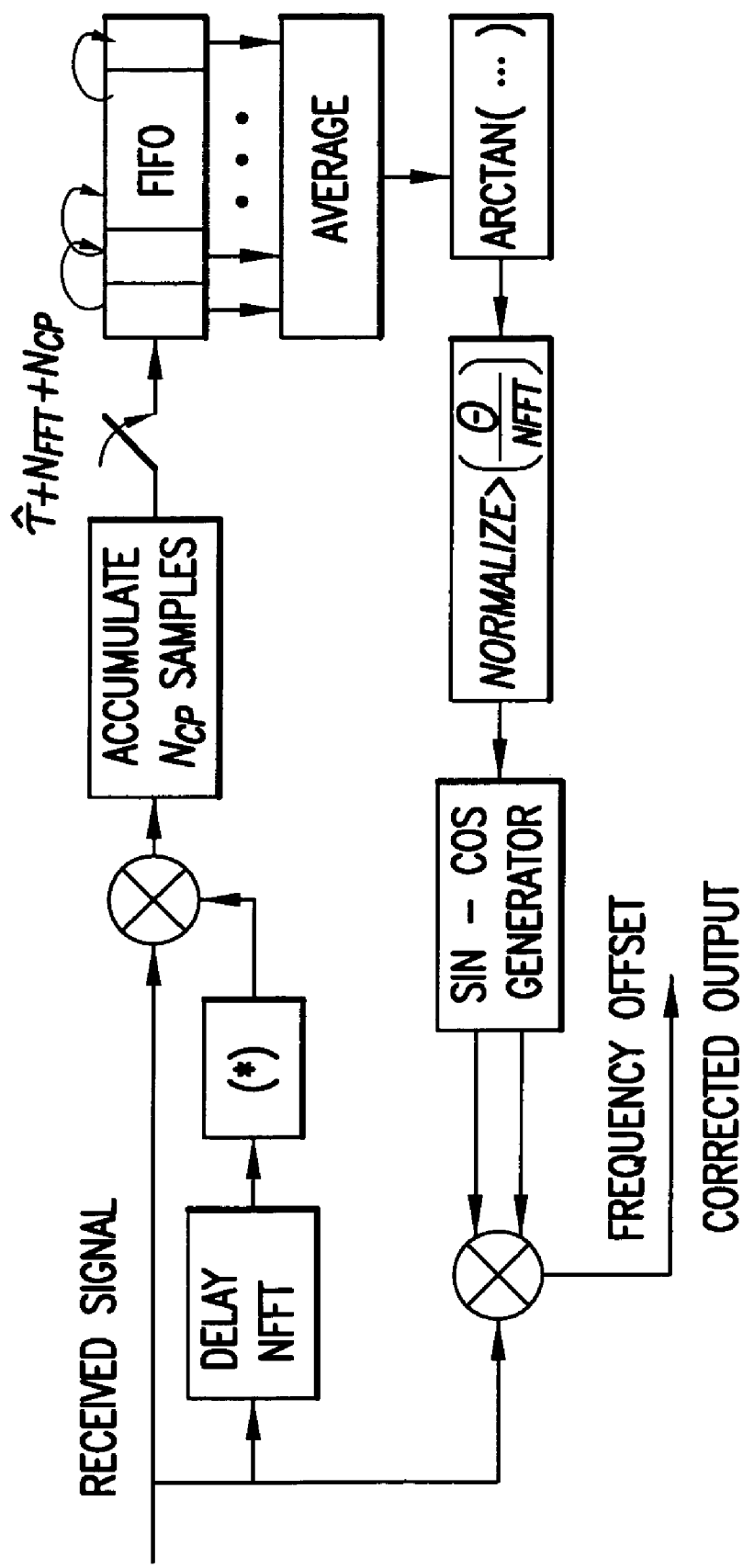
FIG. 10 is a simplified block diagram of circuitry suitable for performing frequency offset estimation and correction.

As is shown in FIG. 10, the frequency-offset estimate is used to generate a continuous wave and to multiply with the time-domain signal.

Various requirements that may be present during the operation of the circuitry shown in FIG. 10 can include that the carrier frequency be tracked within 2% of the sub-carrier spacing before the MS can start UL transmission, e.g., for a 5 MHz system with 512-FFT, Δf~10 KHz, i.e. |FO|<200 Hz.

Various concerns that may arise for CP-based frequency offset estimation include the length of the cyclic prefix (if the length (number of samples) of the cyclic prefix is short then the reliability of the frequency-offset estimation is reduced), higher initial frequency offset (if FO>Δf/2, then the phase will change by more than π within 1-OFDM symbol and CP-based estimation may be inadequate, i.e., it may only track to the nearest sub-carrier, and post FFT frequency domain frequency offset estimation may be required for integer carrier offset tracking.

Frequency Domain Integer Frequency Offset Estimation

Frequency domain carrier offset estimation is required if the time domain frequency offset estimation is inadequate to track a frequency offset greater than the sub-carrier spacing (e.g. CP-based frequency offset estimation). This operation can be required for initial acquisition and during the re-synchronization procedure when synchronization is lost. Since the MS needs to acquire the carrier frequency within 2% of the sub-carrier spacing before transmission, frequency domain frequency offset estimation is typically not necessary during the tracking mode.

This algorithm implements a "max" cross-correlation search over the anticipated range to find the integer carrier frequency offset. Assuming that the transmitted preamble is known and that an initial time and fractional frequency offset estimation are available, and that the integer frequency offset range is $[-N_{FO}, N_{FO}]$, the integer frequency offset search computes, $$\hat{i} = \underset{i}{\arg\max} \left( \frac{\left\| \sum_{k=0}^{N_{FFT}-1} R^P(k) \times (S^P(k))_i \right\|^2}{\sum_{k=0}^{N_{FFT}-1} \|R^P(k)\|^2} \right), i \in [-N_{FO}, N_{FO}]$$

In the presence of multipath channels a partial correlation accumulation is implemented to avoid the errors due to phase rotations due to uncorrelated channels.

There are several issues that may arise when one uses a typical OFDM synchronization algorithm for IEEE 802.16e OFDMA mode with TDD radio access. Examples of several of these possible issues are now discussed in turn.

Issue 1) Single Symbol Preamble

In IEEE 802.16e a single cell specific preamble symbol is transmitted. In the frequency domain the data is transmitted on every third sub-carrier for the preamble symbol.

However, since FFT sizes (128, 512, 1024 and 2048) are not a multiple of 3, in theory the preamble symbol does not have any periodicity. However, each successive ⅓ of the symbol is highly correlated.

Issue 2) Multiple FFT and Cyclic Prefix Sizes

Figure 11:
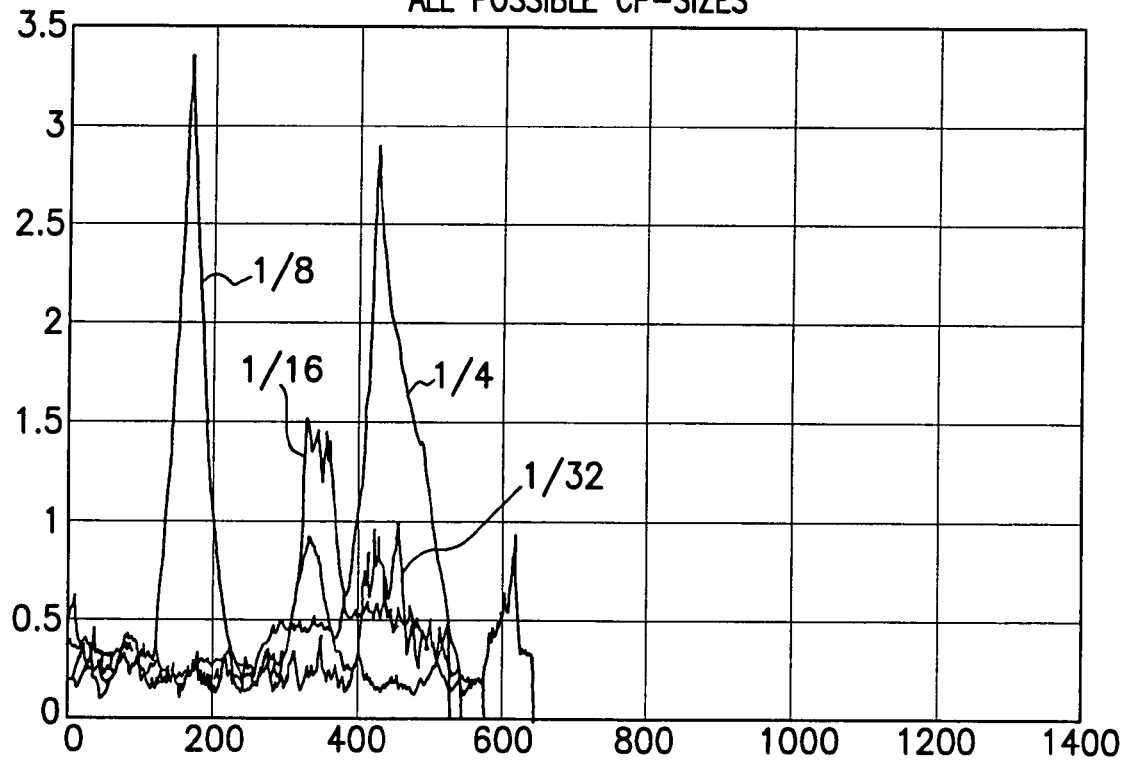
FIG. 11 is a graph showing a cyclic prefix search over all possibilities for an exemplary FFT-512, CP-1/8, in an AWGN channel.

Most conventional OFDM synchronization algorithms were originally designed for a single FFT and CP size. However, in the WiMAX OFDMA mode four different FFT sizes and four different CP sizes are possible. Since the larger CP size encompasses the smaller CP sizes, employing a CP correlation technique to estimate the CP and FFT size could potentially lead to obtaining erroneous results. FIG. 11 shows the CP correlation for a DL sub-frame for FFT-512 with various CP sizes in an AWGN channel. Even though the actual CP size of the transmitted data is ⅛, one may observe significant correlation with the CP size of ¼. Thus, it should be apparent that CP-based estimation is not reliable in differentiating between different CP sizes.

Issue 3) Multiple Preamble Sequences

In the 802.16e OFDMA mode, the preamble pattern uniquely identifies a BS (sector) and FFT size, and a total of 114 preamble sequences are defined for each of the FFT sizes. Thus, an exhaustive search of preambles (cross correlation) in the time domain is not practical due to the implementation complexity and power requirements. Moreover, in the presence of a large carrier frequency offset (>sub-carrier spacing), the preamble acquisition and integer frequency offset estimation become computationally intensive.

Issue 4) TDD Frame

In the IEEE 802.16e TDD mode, the UL and DL sub-frames are time multiplexed, separated by TTG and RTG. Moreover, the frame time may not be a multiple of the symbol time (in fact, it is highly unlikely for the frame time to be an integer multiple of symbol time). Hence, the TTG and RTG times are not multiples of the OFDM symbol time. Thus, the relative symbol boundary changes from DL sub-frame to UL sub-frame (due to TTG) and between two TDD frames (due to RTG).

Figure 12:
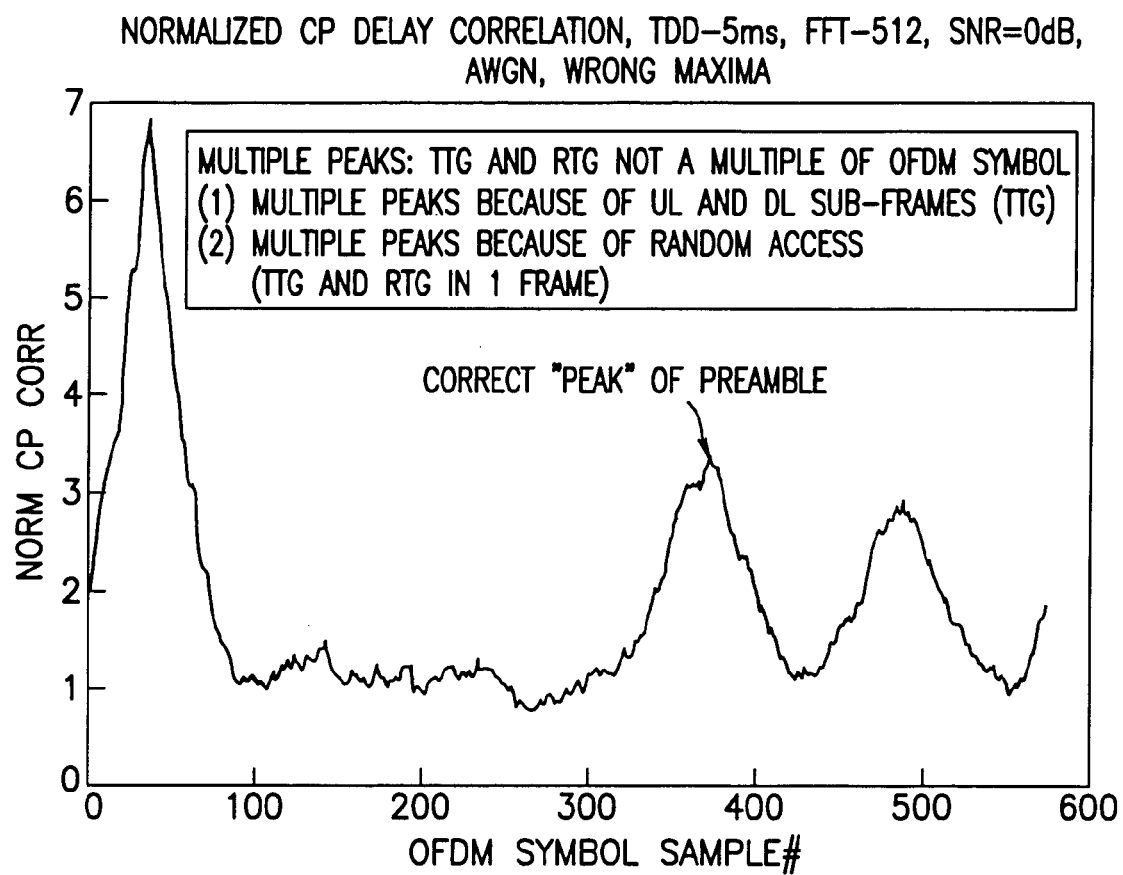
FIG. 12 is a graph showing cyclic prefix correlation for a TDD Frame, FFT-512, CP-1/8, AWGN and a SNR=0 dB.

During the initial synchronization process the MS cannot differentiate between the DL sub-frame, TTG, UL sub-frame or RTG. This leads to multiple peaks during the cyclic prefix search, especially when the correlation is averaged over multiple OFDM symbols. FIG. 12 depicts the discrepancy in CP correlation for a 5 ms TDD frame and an arbitrary DL/UL ratio. The system operates at FFT-512 and a CP ratio of 1/8. The CP correlation is averaged over four OFDM symbols. The two peaks are caused by different symbol boundaries of the DL and UL sub-frame (TTG), while the third peak is present because of the change in symbol boundary when the next frame starts (RTG). Further, the global maximum does not correspond to the actual frame start. In the simulation that produced FIG. 12 synchronized UL traffic (as seen by MS receiver) was assumed. This is not a practical assumption however, and this scenario can be related to a near WiMAX MS acting as a dominant interferer.

There is an impact of the choice of system parameters on synchronization. An IEEE 802.16e standard compliant system may assume many different combinations of system parameters. Certain parameters, such as bandwidth, FFT size, CP size, frame duration and, in the case of TDD mode, DL-UL ratio, RTG and TTG, have direct relevance to the choice and performance of the synchronization algorithm. For example, if all of the different FFT-sizes are implemented with all the possible CP-sizes, then the synchronization algorithm must operate with four different CP sizes for each FFT size. Moreover, if any FFT size is possible with any band/bandwidth, then for each carrier frequency band a total of 16 hypotheses (4 FFTs×4 CPs) must be tested. Thus, a complete flexibility on the choice of system parameters may increase the work-load of the synchronization algorithm logic, which in turn may increase the time to acquire necessary system parameters and/or the receiver power consumption.

The choice of optimum system parameters depends on the coverage area, wireless environment and type of data traffic etc. Moreover, and as was discussed above, the wireless environment may put fundamental limits on the choice of basic system parameters such as FFT size or CP size. The resources (hardware, power and time) required for the receiver algorithms may be reduced by accounting for limited possibilities of system parameters. What follows is a summary of certain practical assumptions on the most possible system parameters relevant for synchronization. Reference may also be made to the WiMAX mobility profile development in the 2-11 GHz workgroup of the WiMAX forum, and to the 3rd Generation Partnership Project, Technical Specification Group on Radio Access Network; Feasibility Study for OFDM for UTRAN enhancement; (Release 6); 3GPP TR 25.892 V1.2.0 (2004-06).

With regard to the choice of FFT size, and although theoretically any FFT-size may be used with any bandwidth, typically the FFT-size would increase with the bandwidth. The practical considerations in choosing the FFT size parameter are similar to those discussed above. Thus, given a band (and bandwidth), the search over FFT-size can be avoided.

According to WiMAX mobility profile development in 2-11 GHz workgroup of WiMAX forum, the typical deployment scenario may be: 5 MHz Bandwidth: FFT Size=512 and 7, 8.75 and 10 MHz Bandwidth: FFT Size=1024.

With regard to the choice of CP size, the CP size is selected such that it is sufficiently long to counter the delay spreads that most commonly occur in the system, as well being short enough so that the overhead due to the CP is minimized. Thus, even if there are four CP sizes (¼, ⅛, 1/16, 1/32), the CP sizes ¼ and 1/32 are typically extreme due to high overhead and insufficient protection, respectively. Most proposals support CP size ⅛, while some support both ⅛ and 1/16, thereby reducing the possible search over multiple CP sizes.

With regard to the choice of TDD frame size, in the WiMAX OFDMA mode there can be eight different frame sizes ranging from 2 ms-20 ms specified. Moreover, in the TDD mode any arbitrary DL/UL ratio is possible. Thus, a worst case time for a synchronization algorithm may depend on the largest possible frame size. However, under practical considerations such as end-to-end delay (in acknowledgement), time selective fading and number of users to be supported, it may be assumed that most initial deployment cases implement a 5 ms TDD frame size with DL/UL ratio between 60/40 and 75/25.

With regard to a common SYNC symbol, an optional common SYNC symbol can be transmitted at every fourth frame as the last OFDM symbol in the DL sub-frame. In a manner similar to the cell-specific DL preamble, the SYNC symbol is also a random PN sequence, generated to minimize the PAPR. The main properties of the common SYNC symbol are that it is unique for each FFT-size, but common between all the BSs, it is repeated twice the during symbol time (data in frequency domain is transmitted over every $2^{nd}$ sub-carrier), and the data symbols in frequency domain are real (BPSK).

The common SYNC symbol, if transmitted, can be utilized to estimate FFT and CP size information. One advantage of the use of the common SYNC symbol is that it is unique for each FFT size, and it is common between all BSs. Moreover, since it repeats (twice) in the time domain, efficient delay correlation techniques can be implemented to acquire the symbol.

However, since it is the last symbol in the DL sub-frame, and the DL/UL ratio may change in various deployment scenarios, it is not suited for use in estimating the frame boundary. However, if one assumes a limited range of the DL/UL ratio, the common SYNC symbol may be used to estimate the frame boundary.

Further, one may exploit the common SYNC symbol to estimate the frequency offset and fading channel. Since it is unique, the frequency domain search of the preamble and integer frequency offset is greatly simplified (i.e., one need not estimate the exact preamble, as it is known a priori).

Thus, while the use of the common SYNC symbol can simplify the synchronization, since it is not mandated in the profile, its use is not further considered herein.

Having thus provided an overview of the IEEE 802.16e system, described now are the exemplary embodiments of this invention, including an enhanced and improved synchronization algorithm for the IEEE 802.16e downlink.

The exemplary embodiments of this invention exploit the following properties of the preamble to obtain time and frequency synchronization.

Time Domain Repetition: Preamble sub-carrier indices are periodic in the frequency domain and hence the preamble repeats in the time domain. However, since the periodicity in the frequency domain R is not a factor of FFT size N, the time domain sequence does not repeat but has high correlation. This property is exploited to perform an initial search to acquire an approximate (rough) boundary of the TDD frame.

Conjugate Symmetry: The preamble data is real in frequency domain and hence the time domain sequence is conjugate-symmetric. This property is exploited to perform conjugate symmetry search over the highly probable region.

In order to perform the conjugate symmetry search in the presence of a frequency offset, the following observation is made:

the received preamble symbol can be written as, $$r^P(n) = \sum_{i=-N_{CP}}^{N_{FFT}-1} \sum_{l=0}^{L-1} s^P(i) h_l(n - m(N_{FFT} + N_{CP}) - i) e^{j2\pi\Delta fn} + z(n),$$

where the preamble symbol is, $$s^P(n) = \begin{cases} s^P(n), & n = 0, 1, 2, \ldots \frac{N_{FFT}}{2} \\ s^{P*}(N-n), & n = \frac{N_{FFT}}{2} + 1, \ldots, N_{FFT} \end{cases}.$$

For ease of understanding, assume the presence of a single path channel that is constant over few OFDM symbols. The received conjugate symmetric samples with an arbitrary carrier phase offset can be given as, $$r^P\left(\frac{N}{2} - n\right) = s^P\left(\frac{N}{2} - n\right) h(0) e^{j2\pi\Delta f\left(\frac{N}{2} - n + i\right)} + z\left(\frac{N}{2} - n\right)$$

$$r^P\left(\frac{N}{2} + n\right) = s^{P*}\left(\frac{N}{2} + n\right) h(0) e^{j2\pi\Delta f\left(\frac{N}{2} + n + i\right)} + z\left(\frac{N}{2} + n\right).$$

Hence, $$M_{CS}\left(\frac{N}{2} - n\right) = r^P\left(\frac{N}{2} - n\right) \times r^P\left(\frac{N}{2} + n\right)$$

$$= \left\| s^P\left(\frac{N}{2} - n\right) \right\|^2 \times (h(0))^2 \times e^{j2\pi\Delta f(N + 2i)} + z\left(\frac{N}{2} - n\right)z\left(\frac{N}{2} + n\right),$$

and hence an accumulated conjugate symmetry search yields, $$X_{CS}(n) = \sum_{i=1}^{\frac{N}{2}-1} r\left(n + \frac{N}{2} - i\right) \times r\left(n + \frac{N}{2} + i\right)$$

$$X_{CS}(n) = (h(n))^2 \times e^{j2\pi\Delta f(N+2n)} \times \sum_{i=1}^{\frac{N}{2}-1} \|s^P(i)\|^2 + \sum_{i=1}^{\frac{N}{2}-1} z(i)z(N-i),$$

and for a preamble symbol, $$X_{CS}(\hat{n}) = (h(\hat{n}))^2 \times e^{j2\pi\Delta f(N+2\hat{n})} \times \sum_{i=1}^{\frac{N}{2}-1} \|s^P(i)\|^2 + \sum_{i=1}^{\frac{N}{2}-1} z(\hat{n}+i)z(\hat{n}+N-i).$$

Thus, the phase term is constant. However, an important consideration in a conjugate symmetric search is the noise enhancement due to multiplication of noise sequences. However, as will be shown below, no adverse effects due to multiplication of noise samples were observed in simulations.

Figure 13:
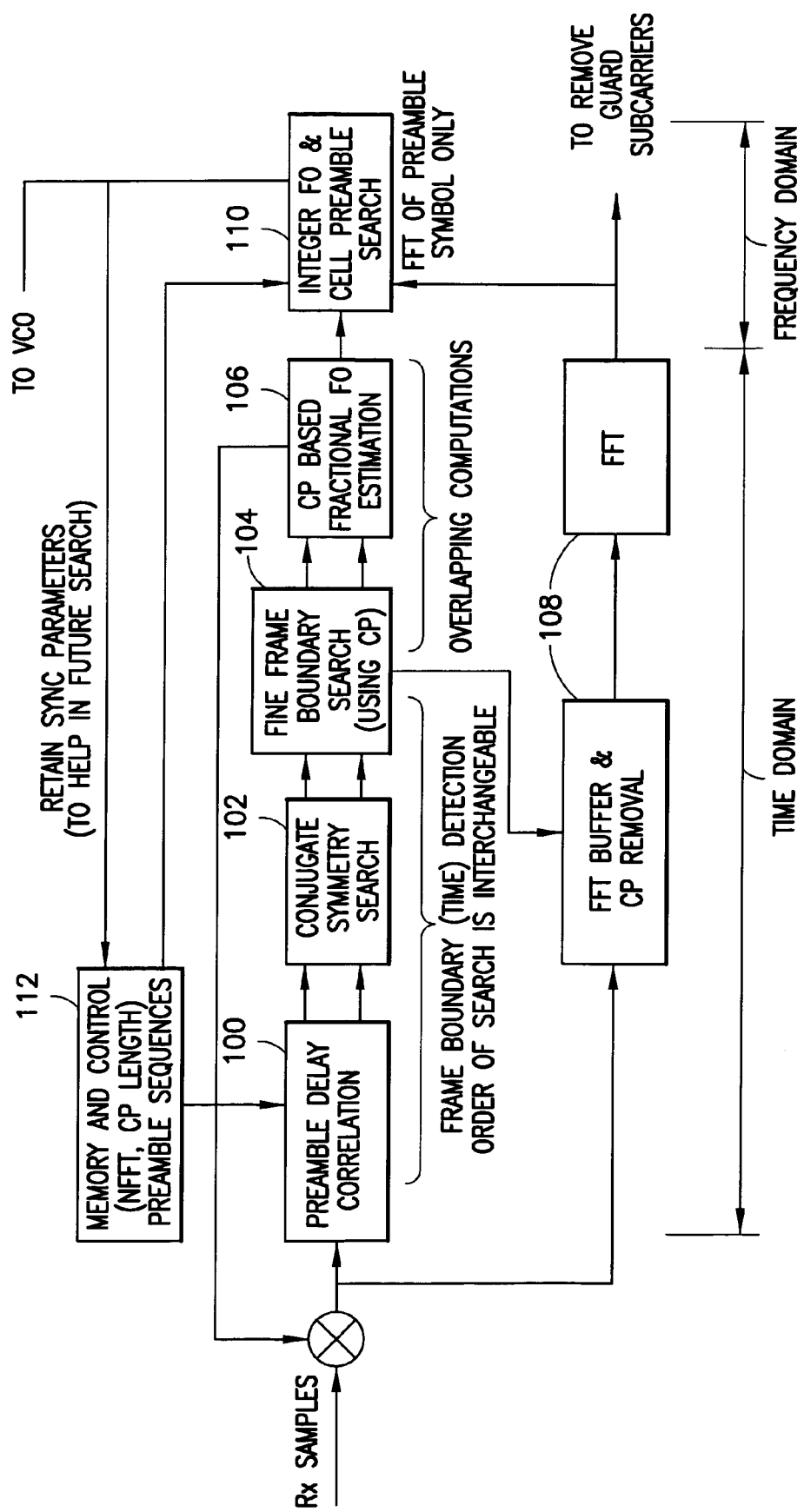
FIG. 13 is a block diagram of a synchronization function in accordance with the exemplary embodiments of this invention.
Figure 16:
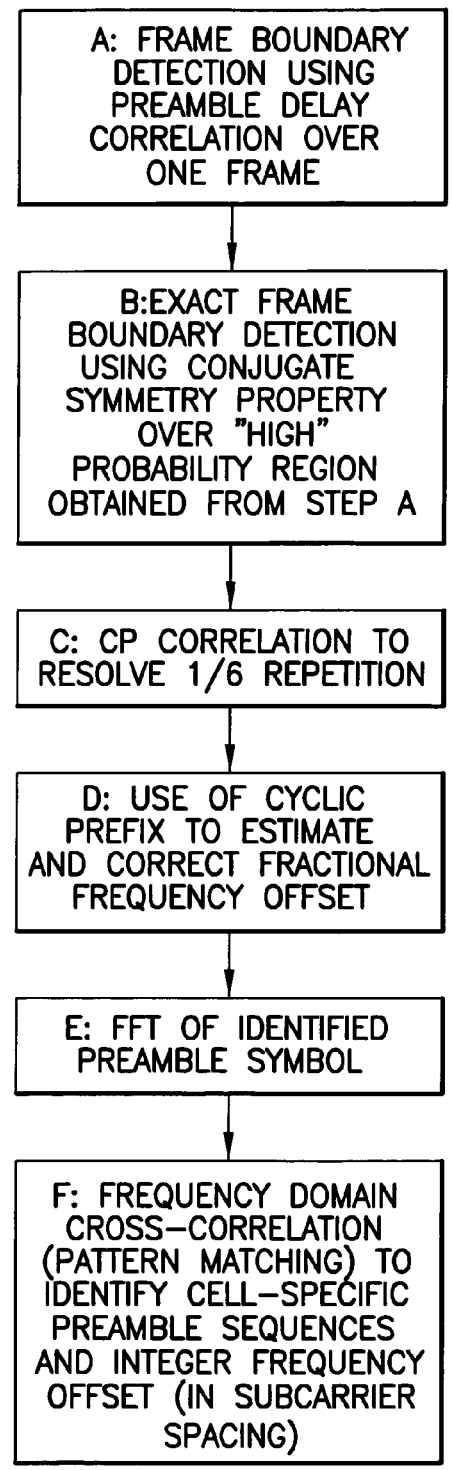
FIG. 16 is a logic flow diagram that illustrates the operation of the synchronization algorithm in accordance with the exemplary embodiments of this invention.

An algorithm in accordance with the exemplary embodiments of this invention implements several steps to achieve time, carrier frequency and cell-specific preamble synchronization. Referring to FIGS. 13 and 16, these functional blocks 100-110 and steps A-F, respectively, operate as follows:

A) Frame boundary detection using preamble delay correlation over 1 frame (block 100);
B) Exact frame boundary detection using conjugate symmetry property over "high" probability region obtained from step A (block 102);
C) CP correlation to resolve 1/6 repetition (block 104);
D) Use of Cyclic Prefix to estimate and correct fractional frequency offset (block 106);

E) FFT of identified preamble symbol (block 108); and

F) Frequency domain cross-correlation (pattern matching) to identify cell specific preamble sequences and integer frequency offset (in sub-carrier spacing) (block 110).

Also shown in FIG. 13 is a memory and control block 112, where the memory 112 stores various parameters useful in obtaining synchronization. The output of block 110 may be sent to a VCO, and the output of block 108 may be used to remove guard sub-carriers.

Figure 17:
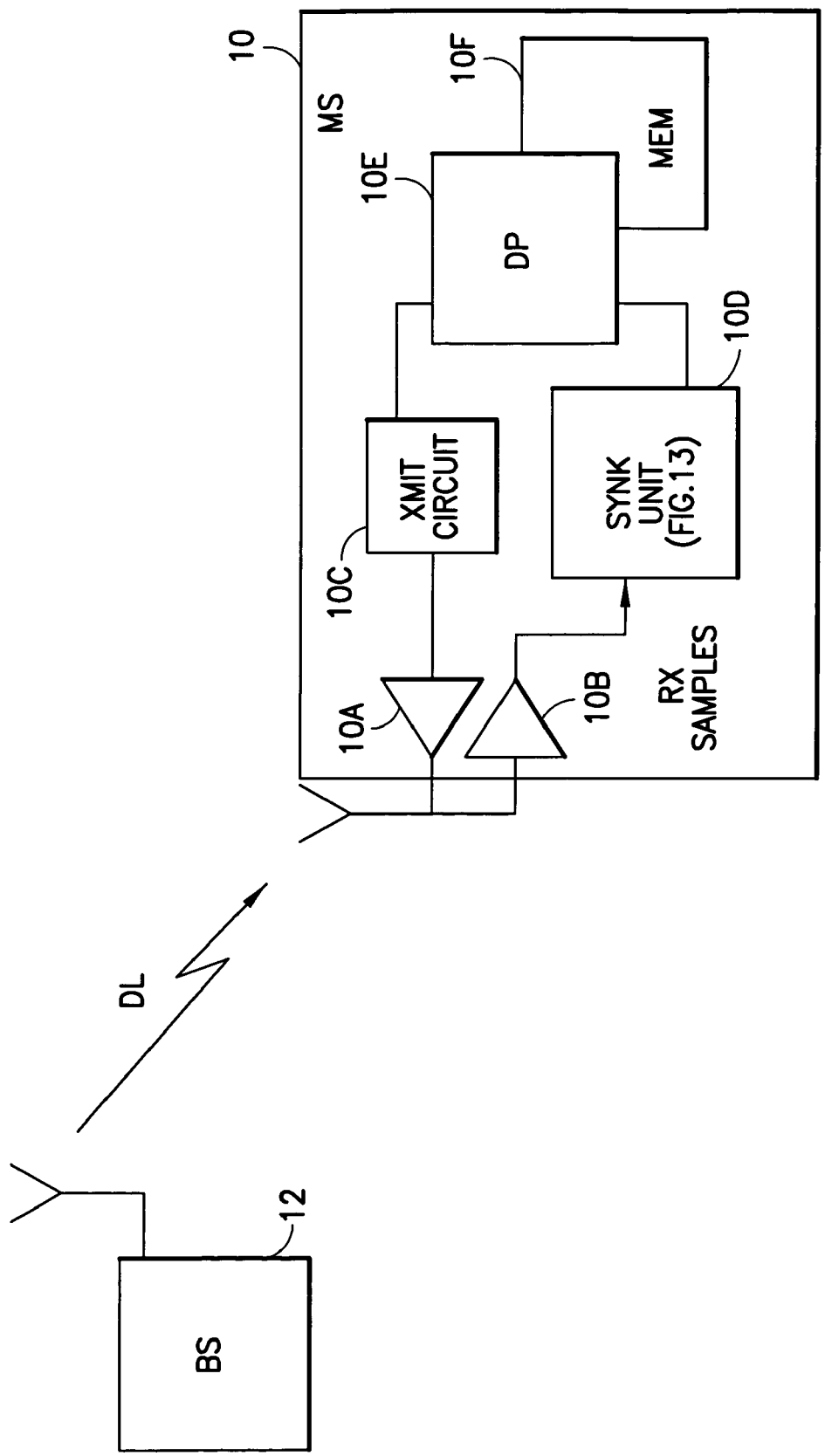
FIG. 17 is a simplified block diagram of a wireless communications system that incorporates a MS that is constructed and operated in accordance with the exemplary embodiments of this invention.

Referring also to FIG. 17 there is shown a simplified block diagram of a wireless communications system that incorporates a MS 10 that is constructed and operated in accordance with the exemplary embodiments of this invention, as well as at least one BS 12. The MS 10 includes a transmitter (XMIT) 10A and associated transmit circuitry 10C, as well as a receiver (RX) 10B. Although one antenna is shown, multiple antennas may be present The output of the receiver 10B, providing RX samples, is applied to the input of the synchronization (SYNC) unit 10D, constructed along the lines shown in FIG. 13. A suitable controller/data processor (DP) 10E and associated memory (MEM) 10F are typically also present. The DP 10E operates in accordance with programs stored in the memory 10F. Note that at least some, or all, of the synchronization functionality depicted in FIG. 13 may be implemented as software/firmware that is executed by the DP 10E and, in this case, the block 10D may be viewed as a virtual functional block. The DP 10E may be constructed using a digital signal processor (DSP), or by using any suitable data processor or processors. The memory 10F may be any suitable type of memory device. The MS 10 may be implemented as a cellular phone, or as any suitable type of device having wireless communications capability. It may be assumed that the system shown in FIG. 17 is compatible with IEEE 802.16e, and that the DL from the BS 12 is an IEEE 802.16e DL, as discussed above. However, it should be further realized that various exemplary aspects of this invention may be used in other than an IEEE 802.16e-compatible system.

Broadly speaking, steps A-C of FIG. 16 acquire an accurate frame boundary, step D estimates the fractional frequency offset, while steps E and F estimate an integer frequency offset and identify the preamble sequence (unique for each BS 12). In the following, each step is explained briefly.

Step A: Preamble Delay Correlation

Figure 14:
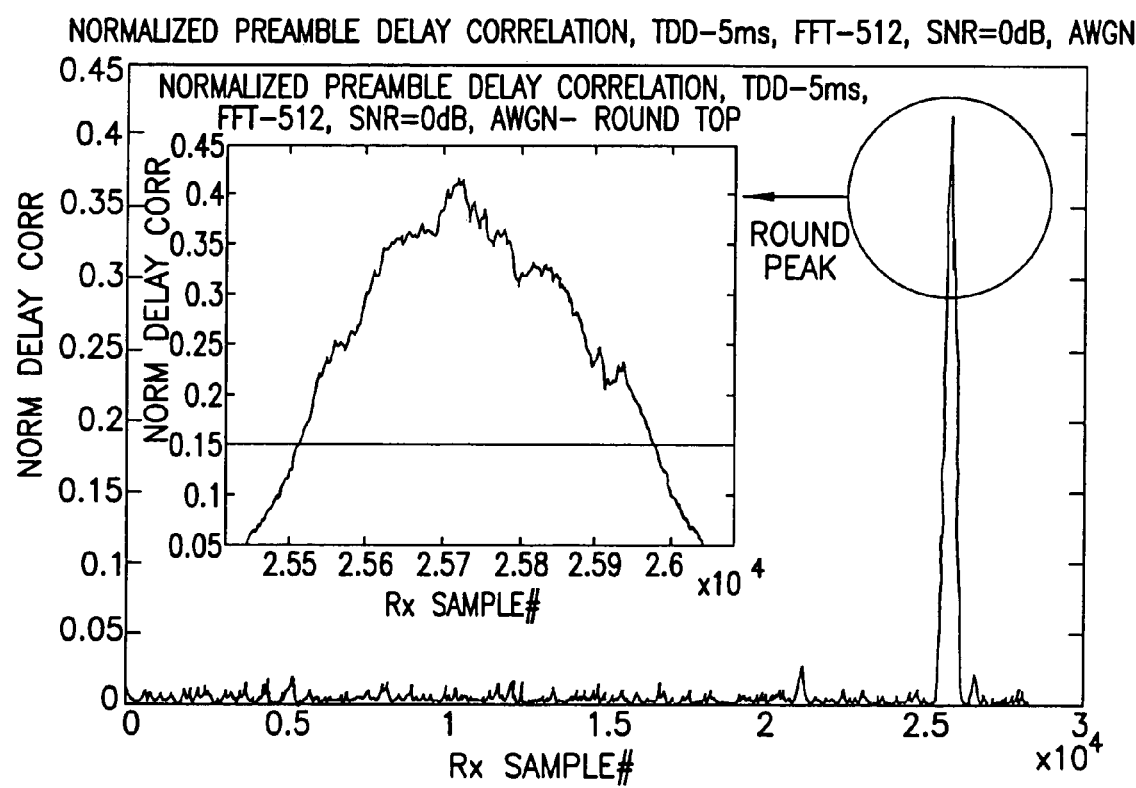
FIG. 14 is a graph showing preamble correlation computation over a 5 ms TDD frame with FFT 512 and CP 1/8 in an AWGN channel.

Preamble delayed correlation is implemented to obtain the initial frame start estimation. The repetitive property of the preamble is exploited. The delay correlation is similar to the cyclic prefix search explained above. The preamble delay correlation technique is also used for packet detection in 802.11a receivers (see J. Heiskala and J. Terry, "OFDM Wireless LANs: A Theoretical and Practical Guide", $1^{st}$ edition, Sams, 2001). FIG. 14 depicts the preamble correlation computation over a 5 ms TDD frame with FFT 512 and CP 1/8 in an AWGN channel. The operating SNR is 0 dB and the signals from all UL users are assumed aligned at the mobile station under consideration. Delay correlation typically yields a round peak as shown in FIG. 14. The correlation value may be accumulated over multiple frames to achieve a more reliable peak. However this technique has large memory requirements, as the values over one TDD frame are stored.

Threshold detection is implemented to select the region of high probability. The correlation value or the threshold value is normalized with received power before the threshold detection. The choice of the threshold value is preferably optimized to reduce further signal processing, while keeping the time required for synchronization as low as possible.

As was explained above, delay correlation can be implemented using two MAC operations per received sample. Delay elements (buffers) may be used to delay the received signal samples.

Step B: Conjugate Symmetry Search

Figure 15:
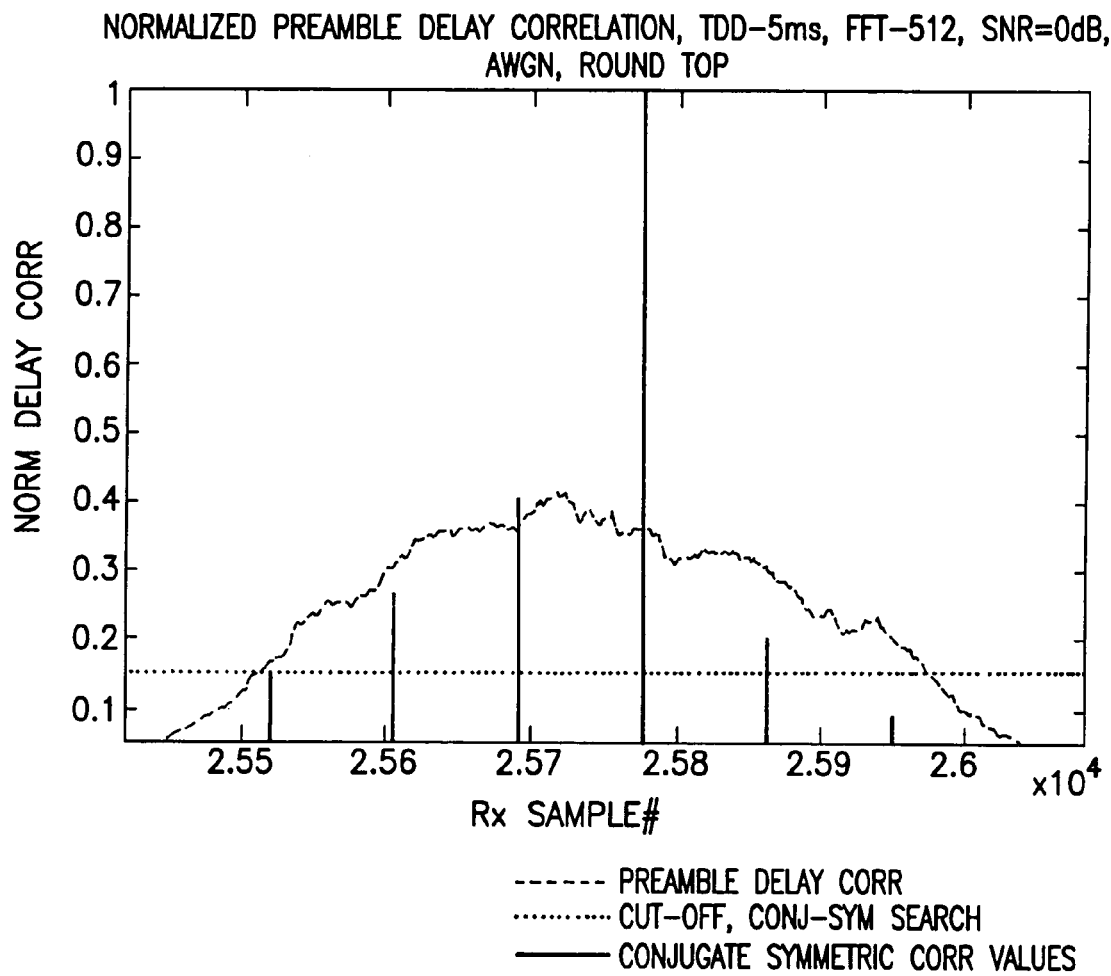
FIG. 15 is a graph showing the result of conjugate symmetry search over the selected indices shown in FIG. 14, and assumes FFT-512, CP-1/8, TDD 5 ms, AWGN at SNR 0 dB.

The conjugate symmetry search is implemented over the indices that pass the threshold in step A (delay correlation). The conjugate symmetry follows the explanation that was presented above. FIG. 15 depicts the result of conjugate symmetry search over the selected indices shown in FIG. 14. The conjugate symmetry search returns sharp peaks at the start of the preamble. Since the preamble has the structure $s^P \approx \lfloor a\, a^*a\, a^*a\, a^* \rfloor$, the conjugate symmetry search returns the peak at roughly $1/6^{th}$ of the symbol boundary. Moreover, additional peaks result due to existence of the CP. A global maximum is then computed among the peaks that cross the second threshold.

The conjugate symmetry search is computationally intensive, needing roughly $N_{FFT}/2 - 1$ complex MAC operations per search (received sample). The computational complexity can be reduced by: (1) optimizing the threshold, or (2) performing a partial search, or (3) performing a conjugate symmetry search to identify symmetry for $N_{FFT}/6 - 1$ samples.

Step C: Cyclic Prefix Acquisition

In a multipath channel, or under low SNR operation, it is possible that the global maximum does not correspond to the exact preamble start but is instead among one of the peaks that is at a distance of integer multiple of $N_{FFT}/6$ from the correct preamble start. To resolve this potential error condition, the CP search is performed over a few OFDM symbols. The CP search is implemented only for those samples (e.g., six samples) which are at a distance multiple of $N_{FFT}/6$ from the index value returned by the conjugate symmetry search.

Let, $\hat{\tau}_{CS}$ be the index value returned by step C, then, $$X_{CP}(n) = \sum_{i=0}^{N_{CP}-1} r\left(\hat{\tau}_{CS} + n\left\lfloor \frac{N_{FFT}}{6} \right\rfloor + i\right) \times r^*\left(\hat{\tau}_{CS} + n\left\lfloor \frac{N_{FFT}}{6} \right\rfloor + i\right),$$

$$n \in [-3, 2]$$

The estimated frame boundary is, $$\hat{\tau} = \hat{\tau}_{CP} = \frac{\arg\max}{n}\left(\frac{\|X_{CP}(n)\|^2}{P(n)}\right), \quad P(n) = \text{Recieved Power}$$

A discussion is now made with regard to time domain frequency offset correction.

Step D: Use of CP to Estimate and Correct Fractional Frequency Offset

The carrier frequency offset may be estimated in stages as in a conventional synchronization strategy. As was explained above, the fractional frequency offset is estimated in the time domain by estimating the phase of CP correlation. Again, to reduce estimation error, the CP correlation is averaged for M OFDM symbols. Let, $\hat{\tau}$ be the estimated frame start, then the normalized phase due to frequency offset can be estimated as, $$\hat{\phi}_{\Delta f} = \tan^{-1}\left(\sum_{m=0}^{M-1} X_{CP}(\hat{\tau} + m(N_{FFT} + N_{CP}))\right).$$

The choice of M depends on the CP size and the frame size. Since in the TDD mode the TTG and UL sub-frame follows the DL sub-frame, the value of M should be within the DL sub-frame boundary. Since the preamble is the first symbol of the DL sub-frame, and FCH and DL/UL MAP messages follow the preamble, a value of M between 4 and 8 is typically suitable. Fractional frequency offset correction is then applied to the received signal. The corrected signal is passed to the next stage for preamble identification as well as integer frequency offset correction.

A discussion is now made with regard now to frequency domain frequency offset correction/preamble searching.

Step E: FFT of Preamble Symbol

In this step a FFT is performed on the fractional frequency offset corrected received preamble symbol, based on the estimated frame start acquired in step C. Since the preamble symbols are transmitted on every third sub-carrier and are real, the frequency domain preamble search reduces to additions, simplifying the computations.

Step F: Integer Frequency Offset and Preamble Search

There are 114 preamble sequences for each FFT size. The preamble for different sectors (BSs) is transmitted over different sets of sub-carriers, using a different offset for each of the (three) sectors. Further, one may consider the integer frequency offset within a prescribed range (e.g., one predetermined based on the crystal accuracy and the highest carrier frequency).

Assuming the integer frequency offset range of $[-N_{FO}, N_{FO}]$, a total of $(2N_{FO}+1) \times 114$ hypotheses should be tested in order to determine both the preamble and integer frequency offset. Let, $$R^P(k) \equiv f\!f\!t(r^P(n)), k,n \in [0, N_{FFT}-1] \text{ and,}$$

$$S^P(k) \equiv f\!f\!t(s^P(n)), k,n \in [0, N_{FFT}-1],$$

then the frequency domain search yields, $$\langle \hat{i}, \hat{m} \rangle = \underset{i,m}{\operatorname{argmax}} \left( \frac{\left\| \sum_{k=0}^{N_{FFT}-1} R^P(k) \times (S_m^P(k))_i \right\|^2}{\sum_{k=0}^{N_{FFT}-1} \|R^P(k)\|^2} \right),$$

$$m = 0, 1, \ldots 113$$
$$i \in [-N_{FO}, N_{FO}],$$

where $(v(n))_i$ denotes the vector $v(n)$, circularly shifted by $i$ values.

The coherent combining shown in the above equation is not suitable for multipath channels, where the channel is flat only over a few sub-carriers. To counter the multipath, the coherent combining is implemented only over (a few) adjacent sub-carriers. The correlation values of different groups of sub-carriers are then combined in a non-coherent manner. If G consecutive sub-carriers are grouped together, then, $$\langle \hat{i}, \hat{m} \rangle = \underset{i,m}{\operatorname{argmax}} \left( \frac{\sum_{q=0}^{\frac{N_{FFT}}{G}-1} \left\| \sum_{g=0}^{G-1} R^P(qG+g) \times (S_m^P(qG+g))_i \right\|^2}{\sum_{k=0}^{N_{FFT}-1} \|R^P(k)\|^2} \right),$$

$$m = 0, 1, \ldots 113$$
$$i \in [-N_{FO}, N_{FO}].$$

The value of G can be determined for the channel having the longest delay spread. For example, for an ITU Pedestrian B channel the maximum delay spread corresponding to the last significant multipath is ~2300 ns, which results in a coherence BW of ~434.78 kHz. For an exemplary WiMAX system with a 5 MHz bandwidth and employing FFT size 512, the sub-carrier spacing is roughly 11.156 kHz. Thus, the channel is uncorrelated after ~39 sub-carriers. In such case, the value of G=32 can be considered as one non-limiting example.

The complexity of the preamble search implementation may be reduced by observing that only additions are required (BPSK data) for coherent accumulation. Moreover, since, the preamble data is transmitted on every third sub-carrier, the actual accumulation length is $$\left\lceil \frac{N_{FFT}}{6} \right\rceil.$$

Based on the foregoing it can be appreciated that there has been provided a novel and useful approach to downlink synchronization in WiMAX that is suitable for use with one or more base stations. Moreover, the synchronization algorithm may be optimized for the parameters in selected WiMAX profiles. Moreover, the various steps of synchronization may be implemented in a different order than those shown explicitly in FIGS. 13 and 16 so as to optimize the computations for different profiles.

Based on the foregoing description it may be appreciated that the exemplary embodiments of this invention pertain to methods, apparatus and computer program products for achieving downlink synchronization. For example, disclosed has been a method to obtain time, carrier frequency and cell-specific preamble synchronization to a transmitted signal by detecting a frame boundary using preamble delay correlation; detecting the frame boundary with greater precision using a conjugate symmetry property over a region identified during the first step of detecting the frame boundary; using cyclic prefix correlation to resolve symbol boundary repetition; using the cyclic prefix to estimate and correct a fractional carrier frequency offset; performing a Fast Fourier Transform of an identified preamble symbol; and performing a frequency domain cross-correlation to identify cell-specific preamble sequences and an integer frequency offset in subcarrier spacing. The transmitted signal is a downlink signal transmitted into the cell from a base station that is compatible with IEEE 802.16e.

Detecting the frame boundary using preamble delay correlation provides an estimate of an initial start of the frame, and comprises the use of a plurality of multiply-and-accumulate (MAC) operations per received signal sample.

Detecting the frame boundary with greater precision comprises performing a conjugate symmetry search over indices that exceed a preamble delay correlation threshold, where the preamble exhibits conjugate symmetric structure, and where the conjugate symmetry search returns peaks at interval defined by the preamble repetition, P.

A global maximum among all peaks that exceed a second threshold may be determined.

Complexity of the conjugate symmetry search may be reduced by at least one of: optimizing the threshold, performing a partial search, and performing the conjugate symmetry search to identify conjugate symmetry within a 1/P-th portion of the preamble symbol that is repeated P-times to make a single preamble symbol.

Using cyclic prefix correlation to resolve symbol boundary repetition comprises resolving a condition where the global maximum does not correspond to an exact preamble start but instead corresponds to a peak that is at a distance of integer multiple of 1/P-th of the preamble symbol from the correct preamble start, and further comprises executing the cyclic prefix search only for those received signal samples that are at a distance multiple of $N_{FFT}/P$ from an index value returned by the conjugate symmetry search.

The cyclic prefix correlation can be measured for $n \times N_{FFT}/P$ samples with $n \in [-P/2, P/2]$ and averaged over M OFDM symbols, where the frame boundary is estimated by, $$\hat{\tau} = \hat{\tau}_{CP} = \operatorname*{argmax}_{n}\left(\frac{\|X_{CP}(n)\|^2}{P(n)}\right), P(n) = \text{Received Power}.$$

Using the cyclic prefix to estimate and correct the fractional carrier frequency offset comprises estimating the fractional frequency offset in the time domain by estimating a phase of the cyclic prefix correlation.

The cyclic prefix correlation is averaged for M OFDM symbols, where $\hat{\tau}$ is the estimated frame start, and where the normalized phase due to frequency offset is estimated as, $$\hat{\phi}_{\Delta f} = \tan^{-1}\left(\sum_{m=0}^{M-1} X_{CP}(\hat{\tau} + m(N_{FFT} + N_{CP}))\right),$$

where the value of M is within a downlink frame boundary.

Performing the FFT of an identified preamble symbol performs the FFT on a fractional frequency offset corrected received preamble symbol, based on the estimated frame start.

Performing the frequency domain cross-correlation to identify cell-specific preamble sequences and the integer frequency offset in sub-carrier spacing is accomplished using an assumption that an integer frequency offset range of $[-N_{FO}, N_{FO}]$, a total of $(2N_{FO}+1) \times N_{Seq}$ hypotheses need to be tested in order to determine both the preamble and integer frequency offset, and by letting, $R^P(k) = \mathit{fft}(r^P(n)), k,n \in [0, N_{FFT}-1]$ and, $S^P(k) = \mathit{fft}(s^P(n)), k,n \in [0, N_{FFT}-1]$, where the frequency domain search yields, $$\langle \hat{i}, \hat{m} \rangle = \operatorname*{argmax}_{i,m}\left(\frac{\left\|\sum_{k=0}^{N_{FFT}-1} R^P(k) \times (S_m^P(k))_i\right\|^2}{\sum_{k=0}^{N_{FFT}-1}\|R^P(k)\|^2}\right),$$

$m = 0, 1, \ldots N_{Seq}$
$i \in [-N_{FO}, N_{FO}]$, where $(v(n))_i$ denotes the vector v(n), circularly shifted by i values and $N_{Seq}$ denotes total number of different preamble sequence present in the given preamble sequence set.

To counter an effect of multipath, coherent combining is implemented only over (a few) adjacent sub-carriers, and where correlation values of different groups of sub-carriers are combined in a non-coherent manner, where if G consecutive sub-carriers are grouped together, then, $$\langle \hat{i}, \hat{m} \rangle = \operatorname*{argmax}_{i,m}\left(\frac{\sum_{q=0}^{\frac{N_{FFT}}{G}-1}\left\|\sum_{g=0}^{G-1} R^P(qG+g) \times (S_m^P(qG+g))_i\right\|^2}{\sum_{k=0}^{N_{FFT}-1}\|R^P(k)\|^2}\right),$$

$m = 0, 1, \ldots N_{Seq}$
$i \in [-N_{FO}, N_{FO}]$, and where the value of G is determined for a channel having a longest delay spread.

The method may be executed by the mobile station 10 that receives a downlink signal from the base station 12.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys,. Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    obtaining time, carrier frequency and cell-specific preamble synchronization to a signal received by a radio frequency receiver by
    detecting by the radio frequency receiver a frame boundary using preamble delay correlation;
    detecting by the radio frequency receiver the frame boundary with greater precision using a conjugate symmetry property over a region identified during the first step of detecting the frame boundary;
    the radio frequency receiver using cyclic prefix correlation to resolve symbol boundary repetition;
    the radio frequency receiver using the cyclic prefix to estimate and correct a fractional carrier frequency offset;
    the radio frequency receiver performing a fast fourier transform of an identified preamble symbol; and
    the radio frequency receiver performing a frequency domain cross-correlation to identify cell-specific preamble sequences and an integer frequency offset in sub-carrier spacing.

2. The method of claim 1, where the received signal is a downlink signal received from a base station that is compatible with IEEE 802.16e.

3. The method of claim 1,
    where detecting the frame boundary using preamble delay correlation provides an estimate of an initial start of the frame, and comprises a use of a plurality of multiply-and-accumulate operations per received signal sample.

4. The method of claim 1,
    where detecting the frame boundary with greater precision comprises performing a conjugate symmetry search over indices that exceed a preamble delay correlation threshold, where the preamble exhibits conjugate symmetric structure, and where the conjugate symmetry search returns peaks at interval defined by a preamble repetition, P.

5. The method of claim 4, further comprising computing a global maximum among all peaks that exceed a second threshold.

6. The method of claim 4, comprising reducing a complexity of the conjugate symmetry search by at least one of: optimizing the threshold, performing a partial search, and performing the conjugate symmetry search to identify conjugate symmetry within a 1/P-th portion of the preamble symbol that is repeated P-times to make a single preamble symbol.

7. The method of claim 5,
    where using cyclic prefix correlation to resolve symbol boundary repetition comprises resolving a condition where the global maximum does not correspond to an exact preamble start but instead corresponds to a peak that is at a distance of integer multiple of 1/P-th of the preamble symbol from the correct preamble start, and further comprises executing the cyclic prefix search only for those received signal samples that are at a distance multiple of $N_{FFT}/P$ from an index value returned by the conjugate symmetry search.

8. The method of claim 7, where the cyclic prefix correlation is measured for $n \times N_{FFT}/P$ samples with $n \in [-P/2, P/2]$ and averaged over M OFDM symbols and where the frame boundary is estimated by, $$\hat{\tau} = \hat{\tau}_{CP} = \underset{n}{\operatorname{argmax}} \left( \frac{\|X_{CP}(n)\|^2}{P(n)} \right), P(n) = \text{Received Power},$$

where $\hat{\tau}$ is an estimated frame start, $\hat{\tau}_{CP}$ is a frame start cyclic prefix, and $X_{CP}$ is a cyclic prefix value.

9. The method of claim 1, where using the cyclic prefix to estimate and correct the fractional carrier frequency offset comprises estimating the fractional frequency offset in the time domain by estimating a phase of the cyclic prefix correlation.

10. The method of claim 9, where the cyclic prefix correlation is averaged for M OFDM symbols, where $\hat{\tau}$ is the estimated frame start, and where the normalized phase due to frequency offset is estimated as, $$\hat{\phi}_{\Delta f} = \tan^{-1}\left( \sum_{m=0}^{M-1} X_{CP}(\hat{\tau} + m(N_{FFT} + N_{CP})) \right),$$

where the value of M is within a downlink frame boundary, $\hat{\tau}$ is an estimated frame start, $\hat{\phi}_{\Delta f}$ is a normalized phase due to frequency offset, $N_{FFT}$ is fast fourier transform buffer size, $N_{CP}$ is a cyclic prefix size, and m is a sub-carrier index.

11. The method of claim 1, where performing the fast fourier transform of an identified preamble symbol performs the fast fourier transform on a fractional frequency offset corrected received preamble symbol, based on the estimated frame start.

12. The method of claim 1, where performing the frequency domain cross-correlation to identify cell-specific preamble sequences and the integer frequency offset in sub-carrier spacing is accomplished using an assumption that an integer frequency offset range of $[-N_{FO}, N_{FO}]$, a total of $(2N_{FO}+1) \times N_{Seq}$ hypotheses need to be tested in order to determine both the preamble and integer frequency offset, and by letting, $R^P(k) = fft(r^P(n)), k, n \in [0, N_{FFT}-1]$ and, $S^P(k) = fft(s^P(n)), k, n \in [0, N_{FFT}-1]$, where the frequency domain search yields, $$\langle \hat{i}, \hat{m} \rangle = \underset{i,m}{\operatorname{argmax}} \left( \frac{\left\| \sum_{k=0}^{N_{FFT}-1} R^P(k) \times (S_m^P(k))_i \right\|^2}{\sum_{k=0}^{N_{FFT}-1} \|R^P(k)\|^2} \right),$$

-continued $$m = 0, 1, \ldots N_{Seq}$$
$$i \in [-N_{FO}, N_{FO}]$$, where $(v(n))_i$ denotes the vector $v(n)$, circularly shifted by i values and $N_{Seq}$ denotes total number of different preamble sequence present in the given preamble sequence set, and where $R^P$ is a received preamble signal, $S^P$ is a preamble structure, $N_{FO}$ is an integer frequency offset, $N_{FFT}$ is a fast fourier transform buffer size, $N_{Seq}$ denotes a total number of different preamble sequence present in the given preamble sequence set, k is a subcarrier index, and m is a subcarrier index.

13. The method of claim 12, where to counter an effect of multipath coherent combining is implemented only over adjacent sub-carriers, and where correlation values of different groups of sub-carriers are combined in a non-coherent manner, where if G consecutive sub-carriers are grouped together, then, $$\langle \hat{i}, \hat{m} \rangle = \underset{i,m}{\arg\max} \left( \frac{\sum_{q=0}^{\frac{N_{FFT}}{G}-1} \left\| \sum_{g=0}^{G-1} R^P(qG+g) \times (S^P_m(qG+g))_i \right\|^2}{\sum_{k=0}^{N_{FFT}-1} \|R^P(k)\|^2} \right),$$

$$m = 0, 1, \ldots N_{Seq}$$
$$i \in [-N_{FO}, N_{FO}]$$, and where the value of G is determined for a channel having a longest delay spread, G is a guard interval, $R^P$ is a received preamble signal, and $S^P$ is a preamble structure.

14. The method of claim 1, executed by a mobile station that receives a downlink signal from a base station.

15. A computer readable medium storing a computer program, execution of the computer program by a data processor resulting in operations that comprise obtaining time, carrier frequency and cell-specific preamble synchronization to a received signal by:
   detecting a frame boundary using preamble delay correlation;
   detecting the frame boundary with greater precision using a conjugate symmetry property over a region identified during the first operation of detecting the frame boundary;
   using cyclic prefix correlation to resolve symbol boundary repetition;
   using the cyclic prefix to estimate and correct a fractional carrier frequency offset;
   performing a fast fourier transform of an identified preamble symbol; and
   performing a frequency domain cross-correlation to identify cell-specific preamble sequences and an integer frequency offset in sub-carrier spacing.

16. The computer readable medium storing the computer program of claim 15, where the received signal is a downlink signal received from a base station that is compatible with IEEE 802.16e.

17. The computer readable medium storing the computer program of claim 15, where the operation of detecting the frame boundary using preamble delay correlation provides an estimate of an initial start of the frame, and comprises a use of a plurality of multiply-and-accumulate operations per received signal sample.

18. The computer readable medium storing the computer program of claim 15, where the operation of detecting the frame boundary with greater precision comprises performing a conjugate symmetry search over indices that exceed a preamble delay correlation threshold, where the preamble exhibits conjugate symmetric structure and where the conjugate symmetry search returns a peak at interval defined by a preamble repetition, P.

19. The computer readable medium storing the computer program of claim 18, further comprising computing a global maximum among all peaks that exceed a second threshold.

20. The computer readable medium storing the computer program of claim 18, comprising reducing a complexity of the conjugate symmetry search by at least one of: optimizing the threshold, performing a partial search, and performing the conjugate symmetry search to identify conjugate symmetry within a 1/P-th portion of the preamble symbol that is repeated P-times to make a single preamble symbol.

21. The computer readable medium storing the computer program of claim 19, where the operation of using cyclic prefix correlation to resolve symbol boundary repetition comprises resolving a condition where the global maximum does not correspond to an exact preamble start but instead corresponds to a peak that is at a distance of integer multiple of 1/P-th of the preamble symbol from the correct preamble start, and further comprises executing the cyclic prefix search only for those received signal samples that are at a distance multiple of $N_{FFT}/P$ from an index value returned by the conjugate symmetry search.

22. The computer readable medium storing the computer program of claim 21, where cyclic prefix correlation is measured for $n \times N_{FFT}/P$ samples with $n \in [-P/2, P/2]$ and averaged over M orthogonal frequency division multiplexing symbols and where the frame boundary is estimated by, $$\hat{\tau} = \hat{\tau}_{CP} = \underset{n}{\arg\max}\left(\frac{\|X_{CP}(n)\|^2}{P(n)}\right), \quad P(n) = \text{Recieved Power}$$

where $\hat{\tau}$ is an estimated frame start, $\hat{\phi}_{\Delta f}$ is a normalized phase due to frequency offset, $N_{FFT}$ is a fast fourier transform buffer size, $X_{CP}$ is a cyclic prefix value, and $\hat{\tau}_{CP}$ is a frame start cyclic prefix.

23. The computer readable medium storing the computer program of claim 15, where the operation of using the cyclic prefix to estimate and correct the fractional carrier frequency offset comprises estimating the fractional frequency offset in the time domain by estimating a phase of the cyclic prefix correlation.

24. The computer readable medium storing the computer program of claim 23, where the cyclic prefix correlation is averaged for M orthogonal frequency division multiplexing symbols, where $\hat{\tau}$ is the estimated frame start, and where the normalized phase due to frequency offset is estimated as, $$\hat{\phi}_{\Delta f} = \tan^{-1}\left(\sum_{m=0}^{M-1} X_{CP}(\hat{\tau} + m(N_{FFT} + N_{CP}))\right),$$

where the value of M is within a downlink frame boundary, $\hat{\phi}_{\Delta f}$ is a normalized phase due to frequency offset, $X_{CP}$ is a cyclic prefix value, $N_{FFT}$ is a fast fourier transform buffer size, $N_{CP}$ is a cyclic prefix size, and m is a sub-carrier index.

25. The computer readable medium storing the computer program of claim 15, where performing the fast fourier transform of an identified preamble symbol performs the fast fourier transform on a fractional frequency offset corrected received preamble symbol, based on the estimated frame start.

26. The computer readable medium storing the computer program of claim 15, where performing the frequency domain cross-correlation to identify cell-specific preamble sequences and the integer frequency offset in sub-carrier spacing is accomplished using an assumption that an integer frequency offset range of $[-N_{FO}, N_{FO}]$, a total of $(2N_{FO}+1) \times N_{Seq}$ hypotheses need to be tested in order to determine both the preamble and integer frequency offset, and by letting, $R^P(k) \equiv \text{fft}(r^P(n)), k, n \in [0, N_{FFT}-1]$ and, $S^P(k) \equiv \text{fft}(s^P(n)), k, n \in [0, N_{FFT}-1]$, where the frequency domain search yields, $$\langle \hat{i}, \hat{m} \rangle = \underset{i, m}{\arg\max} \left( \frac{\left\| \sum_{k=0}^{N_{FFT}-1} R^P(k) \times (S_m^P(k))_i \right\|^2}{\sum_{k=0}^{N_{FFT}-1} \|R^P(k)\|^2} \right), \quad \begin{array}{l} m = 0, 1, \cdots N_{Seq} \\ i \in [-N_{FO}, N_{FO}] \end{array},$$

where (v(n)), denotes the vector v(n), circularly shifted by i values and $N_{Seq}$ denotes total number of different preamble sequence present in the given preamble sequence set, $R^P$ is a received preamble signal, and $S^P$ is a preamble structure, k is a subcarrier index, $N_{Seq}$ denotes a total number of different preamble sequence present in the given preamble sequence set, and m is a subcarrier index.

27. The computer readable medium storing the computer program of claim 26, where to counter an effect of multipath coherent combining is implemented only over adjacent sub-carriers, and where correlation values of different groups of sub-carriers are combined in a non-coherent manner, where if G consecutive sub-carriers are grouped together, then, $$\langle \hat{i}, \hat{m} \rangle = \underset{i, m}{\arg\max} \left( \frac{\sum_{q=0}^{\frac{N_{FFT}}{G}-1} \left\| \sum_{g=0}^{G-1} R^P(qG+g) \times (S_m^P(qG+g))_i \right\|^2}{\sum_{k=0}^{N_{FFT}-1} \|R^P(k)\|^2} \right), \quad \begin{array}{l} m = 0, 1, \cdots N_{Seq} \\ i \in [-N_{FO}, N_{FO}] \end{array},$$

and where the value of G is determined for a channel having a longest delay spread, and $N_{FFT}$ is a fast fourier transform buffer size.

28. The computer readable medium storing the computer program of claim 15, where the data processor comprises part of a mobile station that receives a downlink signal from a base station.

29. An apparatus, comprising:
at least one processor and at least one memory including computer program code;
the at least one memory and the computer program code stored on the memory is configured, with the at least one processor, to cause the apparatus, in response to a received downlink signal, to obtain time, carrier frequency and cell-specific preamble synchronization to the received signal said apparatus comprising a plurality of synchronization units comprising a first detector to detect a frame boundary using preamble delay correlation;

a second detector to detect the frame boundary with greater precision using a conjugate symmetry property over a region identified by the first detector;

a cyclic prefix correlator to resolve symbol boundary repetition;

an estimator, using the cyclic prefix, to estimate and correct a fractional carrier frequency offset;

an operator to perform a fast fourier transform of an identified preamble symbol; and a frequency domain cross-correlator to identify cell-specific preamble sequences and an integer frequency offset in sub-carrier spacing.

30. The apparatus of claim 29, where the received signal is a downlink signal received from a base station that is compatible with IEEE 802.16e.

31. The apparatus of claim 29, embodied in a mobile station that receives a downlink signal from a base station.

32. The apparatus of claim 29, where at least some of said plurality of synchronization units are embodied within an integrated circuit.

33. The apparatus of claim 29, where at least some of said plurality of synchronization units are embodied as computer program code stored in a memory device.

34. A mobile station, comprising:
means for receiving a downlink signal, said receiving means operable to obtain time, carrier frequency and cell-specific preamble synchronization to the received signal and comprising a plurality of synchronization units comprising first means for detecting a frame boundary using preamble delay correlation;

second means for detecting the frame boundary with greater precision using a conjugate symmetry property over a region identified by the first means for detecting;

means for cyclic prefix correlation for resolving symbol boundary repetition;

means for estimating and correcting, using the cyclic prefix, a fractional carrier frequency offset;

means for performing a fast fourier transform of an identified preamble symbol; and means for frequency domain cross-correlation for identifying cell-specific preamble sequences and an integer frequency offset in sub-carrier spacing.

35. The mobile station of claim 34, where the received signal is a downlink signal received from a base station that is compatible with IEEE 802.16e.

36. The mobile station of claim 34, where at least some of said plurality of synchronization units are embodied within an integrated circuit.

37. The mobile station of claim 34, where at least some of said plurality of synchronization units are embodied as computer program code stored in a memory device.

* * * * *